(12) United States Patent
Yasumatsu et al.

(10) Patent No.: US 6,548,648 B1
(45) Date of Patent: Apr. 15, 2003

(54) PROCESS FOR PREPARING A MONOAZO METAL COMPLEX SALT COMPOUND FOR CHARGE CONTROL AGENT AND TONER FOR DEVELOPING ELECTROSTATIC IMAGES

(75) Inventors: Masashi Yasumatsu, Osaka (JP); Akihiro Tada, Osaka (JP); Shun-ichiro Yamanaka, Osaka (JP)

(73) Assignee: Orient Chemical Industries, Ltd. (JP)

( * ) Notice: Subject to any disclaimer, the term of this patent is extended or adjusted under 35 U.S.C. 154(b) by 0 days.

(21) Appl. No.: 09/615,199

(22) Filed: Jul. 13, 2000

(30) Foreign Application Priority Data

| Jul. 14, 1999 | (JP) | ............................................ 11-200250 |
| Aug. 19, 1999 | (JP) | ............................................ 11-232333 |

(51) Int. Cl.$^7$ ............................................. C09B 45/01
(52) U.S. Cl. ...................................................... 534/602
(58) Field of Search ........................................ 534/602

(56) References Cited

U.S. PATENT DOCUMENTS

| 5,204,453 A | 4/1993 | Chambon et al. |
| 6,197,467 B1 | 3/2001 | Yamanaka et al. |

FOREIGN PATENT DOCUMENTS

| JP | 8-22969 | 3/1996 |
| JP | 11-7164 | 1/1999 |

OTHER PUBLICATIONS

Louis F. Fieser and Mary Fieser, 1944, Organic Chemistry, *D. C. Heath and Company Boston*.
Joseph J. Lagowski, 1997, Azo, Diazo, Azine, and Azide Functional Groups, *MacMillan Encyclopedia of Chemistry*, vol. 1.
McGraw–Hill, Inc., 1992, Diatomaceous earth; Diazotization, *McGraw–Hill Encyclopedia of Science & Technology*, 7$^{th}$ Edition.

Primary Examiner—Joseph K. McKane
Assistant Examiner—Rebecca Anderson
(74) Attorney, Agent, or Firm—McGlew and Tuttle, P.C.

(57) ABSTRACT

Charge control agent comprising a metal complex salt compound of Formula (I) containing substantially no monoazo compound constituting the ligand thereof, toner containing the charge control agent, and process for manufacturing a metal complex salt compound of Formula (I), which comprises a metallizing reaction for metallizing a monoazo compound of Formula (II) with iron, nickel, aluminum, titanium or zirconium to produce a metal complex salt compound, in which metallizing reaction a monohydric or dihydric alcohol is used as a reaction-promoting solvent:

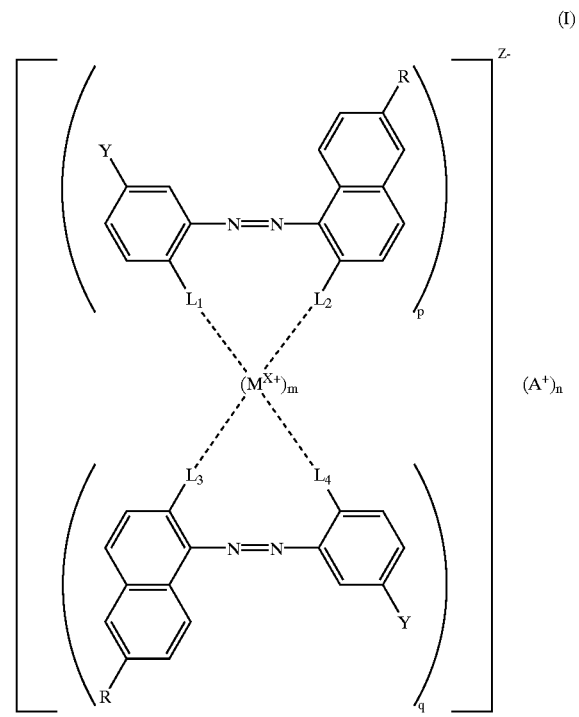

wherein the substituents are as defined in the disclosure.

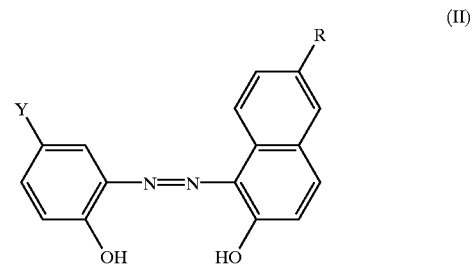

and wherein the monoazo compound of formula (II) is prepared by a diazotizing coupling reaction in which a corresponding 4-Y-2-aminophenol wherein Y is the same as defined above is diazotized to the corresponding diazonium salt, and the diazonium salt is in turn coupled with a corresponding 6-R-2-naphthol wherein R is the same as defined above to form the monoazo compound of formula (II), the diazotizing coupling reaction being carried out in a monohydric alcohol as solvent.

8 Claims, 5 Drawing Sheets

PROCESS FOR PREPARING A MONOAZO METAL COMPLEX SALT COMPOUND FOR CHARGE CONTROL AGENT AND TONER FOR DEVELOPING ELECTROSTATIC IMAGES

BACKGROUND OF THE INVENTION

1. Field of the Invention

The present invention relates to a manufacturing process of a metal complex salt compound with a particular monoazo compound coordinated to a particular metal, more specifically to a manufacturing process which is industrially advantageous and which enables the reduction of the environmental load, and to a charge control agent which can be produced by said manufacturing process, and a toner for developing electrostatic latent images containing said charge control agent.

2. Description of the Prior Art

In copying machines, printers and other instruments based on electrophotography, various toners containing a coloring agent, a fixing resin and other substances are used to visualize the electrostatic latent image formed on the photoreceptor having a light-sensitive layer containing an inorganic or organic photoconductive substance.

Toner chargeability is a key factor in electrostatic latent image-developing systems. Thus, to appropriately control or stabilize the amount of charges of a toner, a charge control agent providing a positive or negative charge is often added to the toner.

Of the conventional charge control agents in actual application, those providing a negative charge for a toner include monoazo compound metal complex salt dyes, and metal complexes or metal salts of aromatic hydroxycarboxylic acids such as alkylsalicylic acids.

However, many of the metal complexes of azo dye structure which have been proposed as charge control agents are generally unstable; for example, they are likely to be decomposed deteriorated to lose their charge control capability when exposed to mechanical friction or impact, electric impact, light irradiation, temperature or humidity changes, etc. Even with a practically applicable charge-providing property, such metal complexes are often unsatisfactory in charge stability or contain impurity chemical substances having no charge control effect depending on the method and conditions of production, thus posing various problems concerning the stability and reliability of their quality as charge control agents. In addition, there has recently been a demand for charge control agents considering environmental concern and safety to the human body.

As charge control agents capable of resolving some of such problems, metal complex salt dyes (compounds) of the following structures, for example, are available.

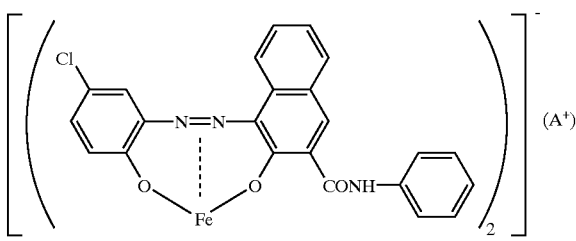

-continued

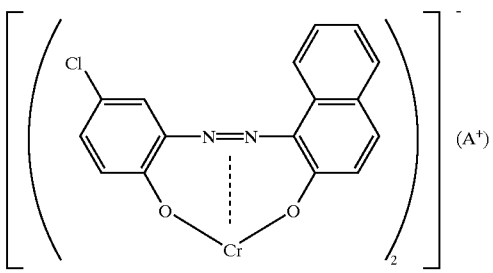

[In the two formulas, $A^+$ is a counter ion such as H (hydrogen), an alkali metal, ammonia or an amine.]

Such metal complex salt dyes are so-called 2:1 type azo metal complex dyes with two molecules of monoazo dye coordinated to one trivalent metal atom.

Traditionally, the commonly used manufacturing process for this kind of metal complex salt dyes has been based on, for example, processes 1 and 2 below.

1) A process wherein a monoazo compound (diazotizing coupling product) having a metallizable group constituting the ligand of the metal complex salt dye is prepared: An aromatic amine derivative having a group suited for the formation of a metal complex salt is first diazotized. The resulting diazonium salt is coupled to a coupling component having a group suited for the formation of a metal complex salt. The monoazo compound produced by coupling is isolated from the aqueous medium.

2) A process wherein the monoazo compound prepared is metallized: The monoazo compound is dissolved or suspended in water, a water-miscible organic solvent, or water-water-miscible organic solvent. Using a metallizing agent under the reaction conditions, the monoazo compound is metallized. The resulting metal complex salt dye is isolated.

However, manufacturing processes like that described above are faulty in that large amounts of waste liquid are produced, and that the process for isolating the coupling product by saluting-out and filtration takes much time and material, and are problematic in that production cost increases as organic solvent separation and recovery and waste liquid treatment are necessary for the process for carrying out a metallizing reaction using a water-miscible organic solvent, and that organic solvent recovery is hampered as large amounts of water is necessary.

As a manufacturing process free from such drawbacks, there may be mentioned the manufacturing process disclosed in Japanese Patent Examined Publication No. 22969/1996, which corresponds to U.S. Pat. No. 5,204,453, issued Apr. 20, 1993. Using this method, a 1:2 type metal complex salt azo dye is obtained by performing diazotization, coupling and metallization in a one pot method (1-container method) without isolating the coupling product, in an aqueous system.

However, when a one-pot manufacturing process in common use or one as based on a reaction in an aqueous system like that described in Japanese Patent Examined Publication No. 22969/1996, is applied to the production of the metal complex salt compound desired in the present invention, the following drawbacks are noted.

i) The solubility of the coupling comiponent is low.
ii) The production rate of the coupling product is slow, and the purity is low.
iii) In the subsequently metallized metal complex salt compound, there observed are impurity substances such as unreacted coupling product and inorganic salts.

In addition, certain conventional metal complex azo dyes for toners, which are excellent in fine pulverizability because of generally hard crystallinity, have problems to be resolved; for example, when used in toners as charge control agents, they show insufficient compatibility (wettability) with the resins for toners, which in turn results in relatively slow charge rise speeds; and the hard crystal is likely to drop off from toner particles during frictional charging as it is partially exposed to the surface of toner particles.

The present invention was developed in view of the above problems in the prior art. Accordingly, it is an object of the present invention to provide a high-purity metal complex salt compound with a monoazo compound having a particular alkyl group (4 to 12 carbon atoms) serving as a ligand, in a high yield in a short time.

It is another object of the present invention to reduce the environmental load by recovering and reusing the solvent.

It is still another object of the present invention to provide a charge control agent which is excellent in charge-providing property and stability and good in dispersibility and wettability in resins for toners, which, when used in a toner, produces a rapid rise of charging and is unlikely to drop off from toner particles during frictional charging and which is excellent in storage stability (temporal stability of charge control characteristic) and durability (charge control characteristic stability in the case of multiple repeated use of toner) and very safe as it contains no harmful heavy metals and yields negative results in the Ames test, and a method for its production.

It is a further object of the present invention to provide a toner for developing electrostatic images which assures fixability and offset resistance over a wide range of temperature, which is excellent in environmental resistance (charge characteristic stability to temperature and humidity changes), storage stability (temporal stability of charge characteristic) and durability (charge characteristic stability in the case of multiple repeated use of toner), which shows a rapid rise of charging and which is capable of forming stable copied images.

SUMMARY OF THE INVENTION (1) The process for manufacturing of the present invention for accomplishing the above objects is a process for manufacturing a metal complex salt compound of General Formula (I) below, which comprises a metallizing reaction for metallizing a monoazo compound of Formula (II) with iron, nickel, aluminum, titanium or zirconium to produce a metal complex salt compound, in which metallizing reaction a monohydric or dihydric alcohol is used as a reaction-promoting solvent:

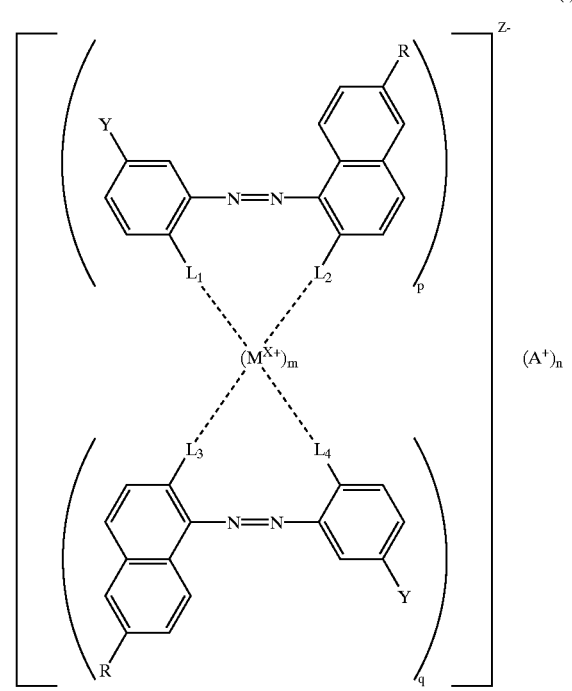

in Formula (I),

R is a normal or branched alkyl group having 4 to 12 carbon atoms;

Y is halogen atom or normal or branched alkyl group having 1 to 5 carbon atoms;

each of p and q shows the number of monoazo compounds coordinated to the metal M; p is 1, 2, 3 or 4; q is 0, 1, 2 or 3; p+q is an integer of 1 to 6;

each of $L_1$ and $L_2$ is —O—;

one of $L_3$ and $L_4$ is —O—, while the other is an —OH group or an —O$^-$ ion;

M is iron, nickel, aluminum, titanium or zirconium;

$(M^{x+})_m$ represents an m number of metals of atomic valence x; m is an integer of 1 to 4; x is an integer of 2 or more;

Z- is the negative charge in the parentheses; $(A^+)_n$ is a hydrogen ion ($H^+$) or an alkali metal ion ($Na^+$, $K^+$, etc.), n=Z;

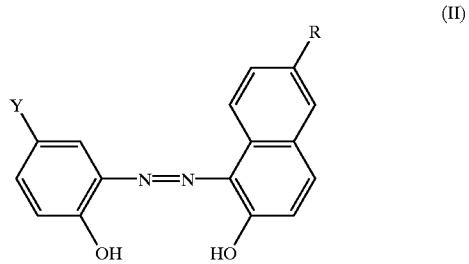

in Formula (II),
R is a normal or branched alkyl group having 4 to 12 carbon atoms;
Y is halogen atom or normal or branched alkyl group having 1 to 5 carbon atoms.

(1-1) The metal complex salt compound manufacturing process of Term (1) preferably comprises a step of cooling the reaction mixture and separating the metal complex salt compound precipitated, from the cooled mixture, after the aforementioned metallizing reaction is carried out using a monohydric alcohol as a reaction-promoting solvent.

(1-2) In the metal complex salt compound manufacturing process of Term (1-1), it is preferable that the metallizing reaction is followed by separating the metal complex salt compound precipitated, from the aforementioned cooled reaction mixture, recovering the monohydric alcohol in the form of an azeotrope with water, and reusing the monohydric alcohol in the azeotrope as the entire reaction-promoting solvent or a part thereof.

(1-3) The metal complex salt compound manufacturing process of Term (1) preferably comprises a step of diazotizing coupling reaction to produce a monoazo compound of Formula (II), in which diazotizing coupling reaction a monohydric or dihydric alcohol is used as a reaction-promoting solvent.

Although the reaction-promoting solvent used in the diazotizing coupling reaction is preferably the same as the reaction-promoting solvent used in the metallizing reaction, it may be different from the latter.

(1-4) The metal complex salt compound manufacturing process of Term (1-3) preferably comprises a step of cooling the reaction mixture and separating the metal complex salt compound precipitated, from the cooled mixture, after the aforementioned diazotizing coupling reaction and metallizing reaction are carried out, using a monohydric alcohol as a reaction-promoting solvent.

(1-5) In the metal complex salt compound manufacturing process of Term (1-4), it is preferable that the metallizing reaction is followed by separating the metal complex salt compound precipitated, from the aforementioned cooled reaction mixture, recovering the monohydric alcohol in the form of an azeotrope with water, and reusing the monohydric alcohol in the azeotrope as the entire reaction-promoting solvent or a part thereof.

(1-6) In the metal complex salt compound manufacturing process of Term (1-4) or (1-5), it is preferable that the aforementioned diazotizing coupling reaction is followed by separating the monoazo compound precipitated, from the reaction mixture, recovering the monohydric alcohol in the form of an azeotrope with water, and reusing the monohydric alcohol in the azeotrope as the entire reaction-promoting solvent or a part thereof.

(1-7) In the metal complex salt compound manufacturing process of Term (1-2), (1-5) or (1-6), it is preferable that the water content in the aforementioned azeotrope is not more than 20% by weight.

(1-8) R in Terms (1) to (1-7) above is preferably a tert-octyl group.

(1-9) In the metal complex salt compound manufacturing process of Term (1) to (1-8) above, it is preferable that Y is chlorine atom.

(1-10) In the metal complex salt compound manufacturing process of Term (1) to (1-9) above, it is preferable that the reaction-promoting solvent is one or more monohydric alcohols selected from the group consisting of ethanol, propanol, 2-propanol, butanol, isobutanol, sec-butanol, tert-butanol, amyl alcohol and isoamyl alcohol.

(1-11) The alcohol serving as a reaction-promoting solvent in Term (1-10) above is preferably 2-propanol.

(1-12) The metal complex salt compound manufacturing process of Terms (1-3), (1-4), (1-5) or (1-6) preferably comprises a step of obtaining a monoazo compound using 4-chloro-2-aminophenol as a diazo component, 6-tertiary octyl-2-naphthol as a coupling component, and 2-propanol as a reaction-promoting solvent; and a step of metallizing the monoazo compound obtained, in an aqueous solvent and 2-propanol as a reaction-promoting solvent.

(1-13) In the metal complex salt compound manufacturing process of Term (1) to (1-12) above, it is preferable that iron chloride is used as a metallizing agent in the metallizing reaction.

(2) The charge control agent of the present invention comprises a metal complex salt compound of General Formula (I) below as an active ingredient, and containing substantially no monoazo compound constituting the ligand thereof:

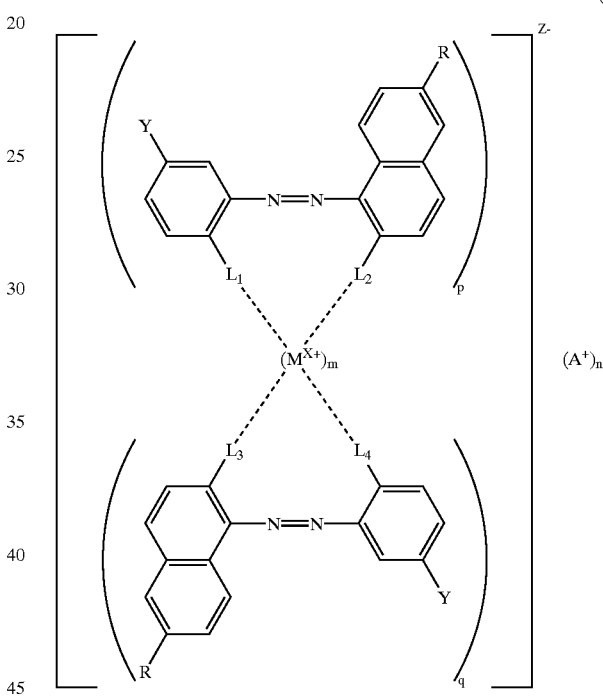

in Formula (I),
R is a normal or branched alkyl group having 4 to 12 carbon atoms;
Y is halogen atom or normal or branched alkyl group having 1 to 5 carbon atoms;
each of p and q shows the number, of monoazo compounds coordinated to the metal M; p is 1, 2, 3 or 4; q is 0, 1, 2 or 3; p+q is an integer of 1 to 6;
each of $L_1$ and $L_2$ is —O—;
one of $L_3$ and $L_4$ is —O—, while the other is an —OH group or an —O$^-$ ion;
M is iron, nickel, aluminum, titanium or zirconium;
$(M^{x+})_m$ represents an m number of metals of atomic valence x; m is an integer of 1 to 4; x is an integer of 2 or more;
Z- is the negative charge in the parentheses; $(A^+)n$ is a hydrogen ion ($H^+$) or an alkali metal ion ($Na^+$, $K^+$, etc.), n=Z.

This charge control agent contains the aforementioned metal complex salt compound at a high purity (not less than about 90% by weight, preferably not less than about 95% by weight, more preferably not less than about 99% by weight), and can be produced by the metal complex salt compound manufacturing process described in Term (1) to (1-13) above.

(2-1) M in Term (2) above is desirably trivalent or divalent iron.

(2-2) The pH of the charge control agent of Term (2) or (2-1) above is preferably 7 to 12.

(2-3) The charge control agent of Term (2) to (2-2) above yields negative results in the Ames test.

(3) The toner of the present invention for developing electrostatic images contains the charge control agent of Term (2) to (2-3) above, a resin for toners, and a coloring agent.

According to the process for manufacturing of the present invention, a metal complex salt compound whose content of unreacted monoazo compound is much smaller than that with conventional compounds, or a metal complex salt compound containing substantially no unreacted monoazo compound, can be produced in a high yield in a short time, and the products obtained by this manufacturing process is excellent in charge control stability, charge rise speed, storage stability, durability, etc., as charge control agents.

According to the invention of Term (1-1) or (1-4) above, a metal complex salt compound of better purity can be produced in a high yield in a short time, and the products obtained by these manufacturing processes are more excellent in charge control stability, charge rise speed, storage stability, durability, etc., as charge control agents.

In addition, according to the invention of Term (1-2), (1-5) or (1-6), significant production cost reduction and environmental load mitigation can both be realized by reusing the monohydric alcohol in the azeotrope recovered.

The charge control agent of the: present invention is excellent in negative charge-providing property and stability and good in dispersibility and wettability in resins for toners. When used in a toner, it produces a rapid rise of charging and is unlikely to drop off from toner particles during frictional charging. It is also excellent in storage stability and durability and very safe as it contains no harmful heavy metals and yields negative results in the Ames test.

Containing the charge control agent of the present invention, the toner of the present invention for developing electrostatic images assures fixability and offset resistance over a wide range of temperature, is excellent in environmental resistance, storage stability and durability, shows a rapid rise of charging, and is capable of constantly forming copied images.

DETAILED DESCRIPTION OF THE INVENTION

Synthesis of Monoazo Compound [Formula (II)]

Figure 1:
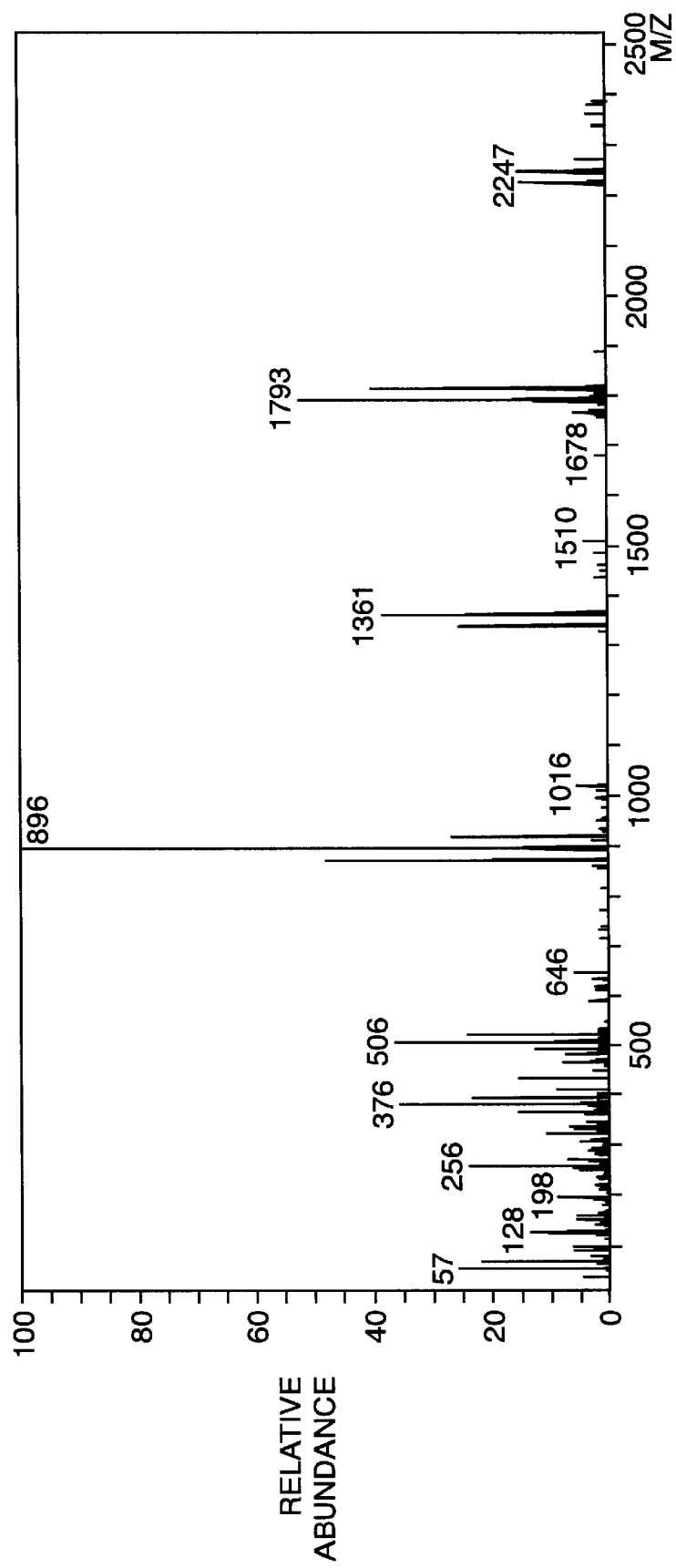
FIG. 1 is an FD-MS spectrum of the iron complex salt compound obtained in Example 1.

A monoazo compound (also referred to as coupling product) of Formula (II), used in the metal complex salt compound manufacturing process of the present invention, can be prepared by carrying out a diazotizing coupling reaction using a monohydric or dihydric alcohol, preferably 2-propanol, as a reaction-promoting solvent.

A preferred embodiment is as follows:

First, to a mixed liquor of 4-chloro-2-aminophenol [diazo component having a group suited for metal complex salt formation (hydroxyl group)], 2-propanol [reaction-promoting solvent], and hydrochloric acid (hydrochloric is acid adjusted to 35%), sodium nitrite (aqueous solution adjusted to 36%) is added, and this mixture is stirred within the temperature range from 0 to 5° C. for 1 to 3 hours to diazotize the 4-chloro-2-aminophenol.

Next, a diazotized solution (aforementioned diazotized compound solution with the NaCl precipitated therein removed by filtration) is added drop by drop to a mixed liquor (kept at 45 to 50° C.) of 6-tertiary octyl-2-naphthol [coupling component having a group suited for metal complex salt formation (hydroxyl group)], an aqueous solution of sodium hydroxide [aqueous solution of hydroxide of alkali metal (Na, K, etc.), and 2-propanol [reaction-promoting solvent], and this mixture is stirred for 2 to 3 hours to couple the diazonium salt to the coupling component.

By collecting by filtration the coupling product precipitated and washing with water, a wet cake of a water content of about 50 to 60% is obtained. By drying the wet cake (e.g. by hot air drying or paddle drying), a high-purity monoazo compound of the following structure can be isolated in the form of powder.

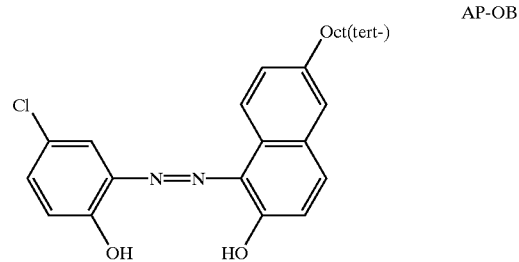

AP-OB

[In this formula, Oct(tert-) is a tertiary octyl group.]

The monoazo compound (coupling product) obtained as described above is of high purity (not less than 95% by weight) and high yield (not less than 90%), because the NaCl produced as a byproduct from the process for its diazotization can be removed, and because the effect of the reaction-promoting solvent accelerates the reaction and increases the reaction rate.

Synthesis of Metal Complex Salt Compound [Formula (I)]

The metal complex salt compound manufacturing process of the present invention may be such that a dry product or wet cake of a monoazo compound [Formula (II)] obtained by the method described above is metallized (preferably with iron) using a metallizing agent (preferably ferric chloride) with a monohydric or dihydric alcohol, preferably 2-propanol, serving as a reaction-promoting solvent. By this method, a metal complex salt compound whose content of unreacted monoazo compound is much smaller than that with conventional compounds, or a metal complex salt compound containing substantially no unreacted monoazo compound, can be produced in a high yield in a short time.

A preferred embodiment is as follows:

The aforementioned monoazo compound [Formula (II)], preferably a coupling product obtained as described above is gradually added to a mixed liquor of 2-propanol [reaction-promoting solvent] and an appropriate amount of an aqueous solution of sodium hydroxide (aqueous solution of hydroxide of alkali metal (Na, K, etc.), i.e., alkaline medium), and this mixture is refluxedunder heating for 1 to 2 hours to dissolve the monoazo compound. Next, a necessary amount of ferric chloride [metallizing agent] is added, and this mixture is refluxed under heating at 75 to 85° C., preferably 80 to 85° C., to metallize the monoazo compound.

After cooling or allowing to cool (usually not higher than about 50° C., preferably not higher than 40° C., more preferably not more than 30° C.) the mixture, the metal complex compound precipitated in the solvent is collected by filtration, washed with water, and dried (e.g. by hot air drying or paddle drying), an iron complex salt compound of Formula (III) below is isolated in the form of blackish brown powder.

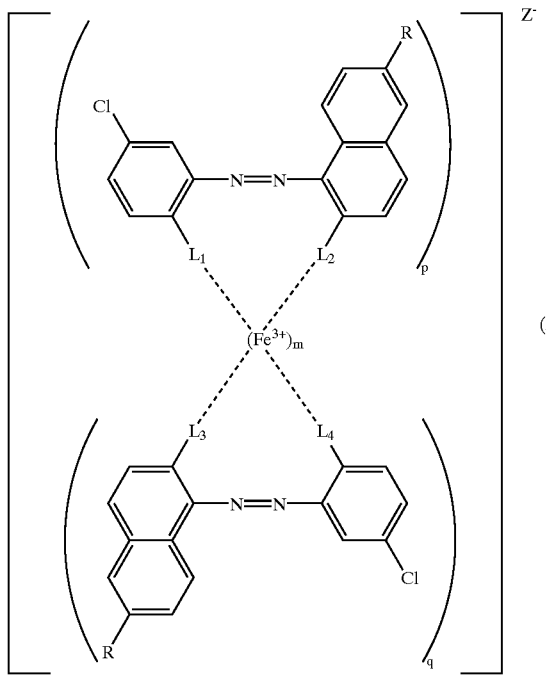

(III)

[In Formula (III), R, p, q, $L_1$, $L_2$, $L_3$, $L_4$, m, n, $Z^-$ and ($A^+$) have the same definitions as those given above.]

Specifically, the iron complex salt compound obtained is usually a mixture of a 2:1 type iron complex salt compound below wherein two monoazo compounds are coordinated to one Fe(III)

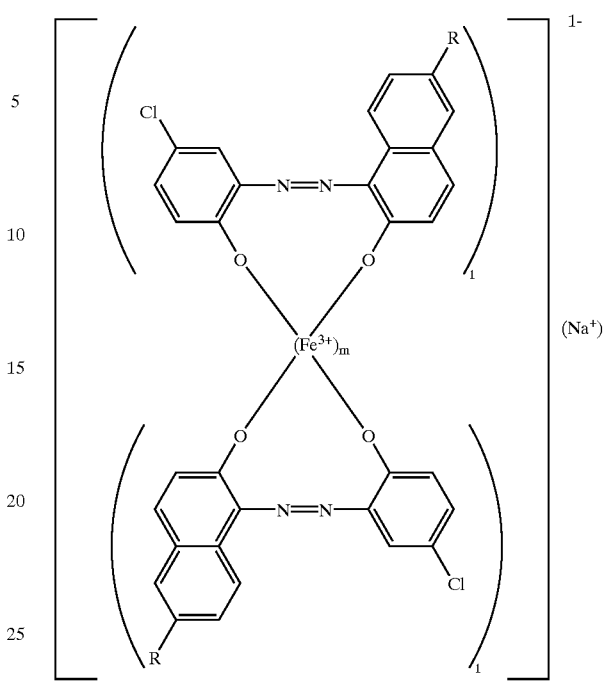

and all or some of 3:2 type metal complex salt compounds of Formula (III) wherein p+q=3 (p is 1, 2 or 3; q is 0, 1 or 2) and m=2; 4:2 type metal complex salt compounds wherein p+q=4 (p is 1, 2, 3 or 4; q is 0, 1, 2 or 3) and m=2; 6:4 type metal complex salt compounds wherein p+q=6 (p is 3 or 4; q is 2 or 3) and m=4; and polymeric metal complex salt compounds (see Examples). In the case of such an iron (III) complex salt compound, it is usually obtained as a mixture containing a 2:1 type iron complex salt compound, a 3:2 type iron complex salt compound, and a 4:2 type iron complex salt compound.

Although the production ratio of each compound obtained as such a mixture varies depending on the reaction conditions for the desired product, it is impractical to separate a single compound from such a mixture; furthermore, the metal complex salt compound in the present invention need not be a single substance. However, each product can be identified by FD-MS analysis.

It is desirable that the filtrate obtained by collecting by filtration the coupling product (monoazo compound) precipitated after the aforementioned diazotizing coupling reaction, from the reaction mixture, and/or the filtrate obtained by collecting by filtration the metal complex salt compound precipitated after the aforementioned metallizing reaction, from the cooled reaction mixture, be separated into water and an azeotrope of 2-propanol and water (2-propanol:water=87.64:12.36 [ratio by weight]) by distillation, and that the 2-propanol (monohydric alcohol) in the azeotrope be reused as the entire reaction-promoting solvent or a part thereof in monoazo compound synthesis and/or metal complex salt compound synthesis as described above. In such reuse of monohydric alcohol, the azeotrope can be used as is. Although purity can be further increased by azeotropic distillation or extractive distillation, it is undesirable because of increased cost.

The monohydric alcohol serving as a reaction-promoting solvent used in the manufacturing process of the present invention is exemplified by methanol; monohydric alcohols having 2 to 5 carbon atoms which make azeotropic mixtures, such as ethanol, propanol, 2-propanol (isopropanol), butanol, isobutanol, sec-butanol, tert-butanol, amyl alcohol and isoamyl alcohol; and monohydric alcohols such as ethylene glycol monoalkyl (1 or 2 carbon atoms) ethers.

The dihydric alcohol is exemplified by dihydric alcohols such as ethylene glycol.

The reaction-promoting solvent may be any one, as long as it is capable of dissolving the diazo component (e.g. 4-chloro-2-aminophenol) and the diazotized product thereof in an acidic aqueous solution in the diazotization process, enables the separation and removal of a fair amount of the byproduct salt, and is capable of dissolving the coupling component (e.g. 6-tertiary octyl-2-naphthol) in an alkaline aqueous solution in the coupling process, and as long as the coupling product produced in this reaction solvent system is precipitated (A reaction-promoting solvent may be used if the coupling product produced is substantially precipitated when the solvent is diluted in water. If the coupling product produced can be precipitated in the reaction-promoting solvent without such dilution, such reaction-promoting solvent is more preferable.). Preferred as reaction-promoting solvents are monohydric alcohols having 1 to 5 carbon atoms, with greater preference given to 2-propanol. In cases where the monohydric alcohol in the azeotrope is reused, its purity is preferably as high as possible. Particular preference is given to 2-propanol having a purity of not lower than 87.6%.

Although the reaction-promoting solvent used in the metallization process for the monoazo compound may be the same as that used in the diazotizing coupling process, or not, it is desirably such that the monoazo compound dissolves during heating in a mixed solvent (alkaline) with water. In addition, the reaction-promoting solvent is preferably such that the metallized compound (desired product) is precipitated by cooling or allowing to cool. From the viewpoint of recovery and separation and recycled use, the former is preferably the same as the latter.

The amount of reaction-promoting solvent used in the diazotizing coupling process and metallizations process is desirably minimized from the viewpoint of material cost, as long as it meets the various conditions described above. When 2-propanol, for example, is used as a reaction-promoting solvent, its amount may be about not less than 4 times by weight the amount of the diazo component, about not less than 3 times by weight the amount of the coupling component, and about not less than 1.8 times by weight the amount of the monoazo compound in the metallization process.

In cases where the azeotrope of 2-propanol and water (2-propanol:water=87.64:12.36 [ratio by weight]) is used, it is preferable that its amount be about 4 to 9 times by weight the amount of the diazo component, about 3 to 6 times by weight the amount of the coupling component, and about 1.1 to 3.5 times by weight the amount of the monoazo compound in the metallizing process. If the amount of use is smaller than the lower limit of the preferable range, the purity and yield of the monoazo compound tends to fall in the diazotizing coupling reaction, and the dissolution of the monoazo compound and the smooth progress of the reaction tend to be hampered so that the purity of the metal complex salt compound tends to be low after the metallizing reaction.

Other organic solvents useful for the monoazo compound metallizing reaction (the metallizing reactions excluded from the metallizing reactions of the present invention) include traditionally commonly used ethylene glycol dialkyl ether-series organic solvents such as ethylene glycol dimethyl ether (monoglyme), diethylene glycol dimethyl ether (diglyme), ethylene glycol diethyl ether, triethylene glycol dimethyl ether (triglyme) and tetraethylene glycol dimethyl ether (tetraglyme); and aprotic polar solvents such as N,N-dimethylformamide, N,N-dimethylacetamide, N-methyl-2-pyrrolidone and dimethyl sulfoxide.

The metal atoms capable of chelate binding with the two —OH groups in the monoazo compound (coupling product) in the metal complex salt compound in the present invention are the trivalent metals iron (III), aluminum (III), is nickel (III), titanium (III) and zirconium (III), the divalent metals iron (II) and nickel (II), and the tetravalent metals titanium (IV) and zirconium (IV). In the present invention, divalent or trivalent iron, especially trivalent iron is preferred from the viewpoint of environmental issues and manufacturing cost.

Examples of metallizing agents preferably used to produce the metal complex salt compound in the present invention include e.g., metal salt compounds, and particularly iron compounds such as ferric chloride, ferric sulfate, ferrous sulfate, ferric nitrate and ferrous ferric chloride ($Fe_3Cl_7 \cdot xH_2O$, $Fe_3Cl_8 \cdot xH_2O$); aluminum compounds such as aluminum sulfate and basic aluminum acetate; and metal chlorides such as nickel chloride, titanium trichloilride (III), titanium tetrachloride (IV), zirconium chloride (III) and zirconium chloride (IV). Preferred from the viewpoint of the objects of the present invention, material cost and ease of handling is ferric chloride, especially an aqueous solution of ferric chloride.

The amount of metallizing agent used is ½ to 2 atomic equivalents, preferably ½ to ⅔ atomic equivalents per equivalent of the monoazo compound serving as the ligand.

Although the tert-octyl group is particularly preferable as the substituent R in the monoazo compound and the metal complex salt compound in the present invention (normal or branched alkyl group R having 4 to 12 carbon atoms in the various formulas above), other examples include t-butyl group, isoamyl group, hexyl group, n-octyl group, 2-ethylhexyl group, n-nonyl group, n-decyl group and dodecyl group.

Examples of the substituent Y in the monoazo compound and the metal complex salt compound in the present invention (halogen atom or normal or branched alkyl group Y having 1 to 5 carbon atoms in the various formulas above) include halogens such as Cl, Br and I and alkyl groups having 1 to 5 carbon atoms such as methyl group, ethyl group, isopropyl group, propyl group, butyl group, isobutyl group, tert-butyl group, amyl group, isoamyl group and tert-amyl group. Preference is given to Cl atom or tert-butyl group.

In addition, it is particularly preferable that the charge control agent in the present invention is an iron complex salt compound of Formula (IV) below.

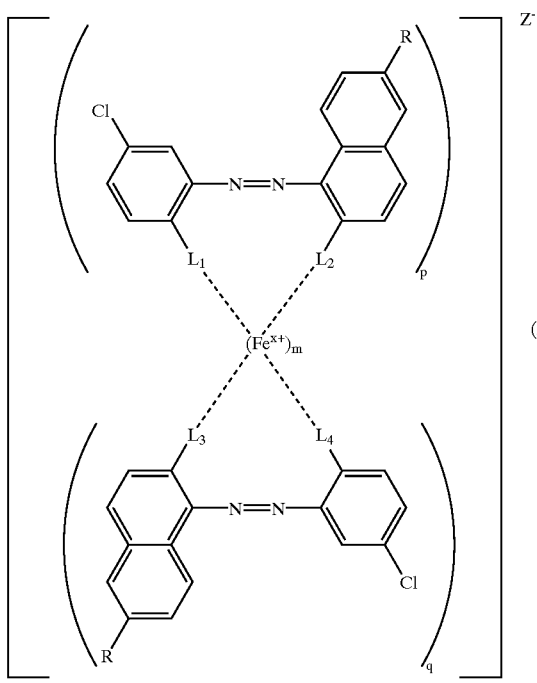

[In Formula (IV), p, q, $L_1$, $L_2$, $L_3$, $L_4$, m, n, Z– and ($A^+$) have the same definitions as those given above; R is a tertiary octyl group {i.e., Oct(tert-)}].

Iron complex salt compounds of Formula (IV) above include, for example, the groups of compounds shown below.

(i) Group of 2:1 type metal complex salt compounds (dyes) of Formula (IV) wherein p=2, q=0, $(M^{x+})m=(Fe^{3+})_1$, and $(A^+)n=(A^+)n$, hereinafter described as Formula (a) below:

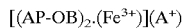
[(AP-OB)$_2$.(Fe$^{3+}$)](A$^+$)      Formula (a):

(ii) Group of 3:2 type metal complex salt compounds of Formula (IV) wherein p+q=3, $(M^{x+})m=(Fe^{3+})_2$, and $(A^+)n=(A^+)n$, hereinafter described as Formula (b) below:

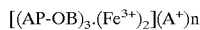
[(AP-OB)$_3$.(Fe$^{3+}$)$_2$](A$^+$)n      Formula (b):

(iii) Group of 4:2 type metal complex salt dyes of Formula (IV) wherein p+q=4, $(M^{x+})m=(Fe^{3+})_2$, and $(A^+)n=(A^+)n$, hereinafter described as Formula (c) below:

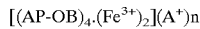
[(AP-OB)$_4$.(Fe$^{3+}$)$_2$](A$^+$)n      Formula (c):

(iv) Group of 1:1 type metal complex salt compounds of Formula (IV) wherein p=1, q=0, $(M^{x+})m=(Fe^{2+})$, and $(A^{30})n=(A^{30})o$ (exclusively x=2), hereinafter described as Formula (d) below:

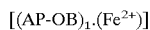
[(AP-OB)$_1$.(Fe$^{2+}$)]      Formula (d):

In Formulas (a) through (d) above, (AP-OB) is a ligand via which a monoazo compound (Formula II) having two metallizable OH groups is coordinated to iron as metal ion. The group of compounds (iron complex salt compounds) of Formula (a) are iron complex salt compounds wherein two monoazo compounds are coordinated to one iron ion. The group of compounds of Formula (b) are iron complex salt compounds wherein three monoazo compounds are coordinated to two iron ions. The group of compounds of Formula (c) are iron complex salt compounds wherein four monoazo compounds are coordinated to two iron ions. The group of compounds of Formula (d) are iron metal complex salt compounds wherein one monoazo compound is coordinated to one divalent iron ion. The number n of ($A^{30}$), which serves as counter ion, is necessary to neutralize the negative charge (Z–) possessed by the mother compound, and meets the requirement of Z=n.

The charge control agent in the present invention may be any one kind of iron complex salt compound selected from the aforementioned groups of compounds, and may, for example, be a mixture of two kinds of iron complex salt compounds respectively selected from the two groups of compounds of Formulas (a) and (b), a mixture of two kinds of iron complex salt compounds respectively selected from the two groups of compounds of Formulas (a) and (b), and one kind of iron complex salt compound selected from the group of compounds of Formula (c) or, as the case may be, Formula (d), or a mixture of three or four kinds of iron complex salt compounds respectively selected from the three or four groups of compounds of Formulas (a), (b) and (c) and, as the case may be, Formula (d).

In referring to the term "one kind" as used herein, the metal (iron) chelate binding condition of the ligand (AP-OB) and kind of counter ion $A^+$ do not matter. In other words, each of $L_1$ through $L_4$ in Formula (IV) forms —O— (e.g., $L_1$ and $L_2$ above) basically as coordinated to iron (metal M); however, cases where either of the two metallizable hydroxyl groups (OH) of the monoazo compound is chelate bound are also included (e.g., $L_3$ and $L_4$ above). The counter ion $A^+$ is $H^+$, $Na^+$, or the like, and may be present alone or in mixture. The counter ion $A^+$ can depend on the reaction conditions and final product takeout conditions (pH). For example, if the product is taken out in a hydrochloric acid acidic atmosphere, the counter ion $A^{30}$ can be $H^+$. If the product is taken out in an alkaline atmosphere, the counter ion $A^+$ can, for example, be a sodium salt. In addition, if the product is taken out under nearly neutral conditions, such counter ions can be present in mixture.

Next, five examples of coordinate bonds for the monoazo compound in iron complex salt compounds of Formula (IV) above are given without specifying the number of ligands and the charge number of Fe.

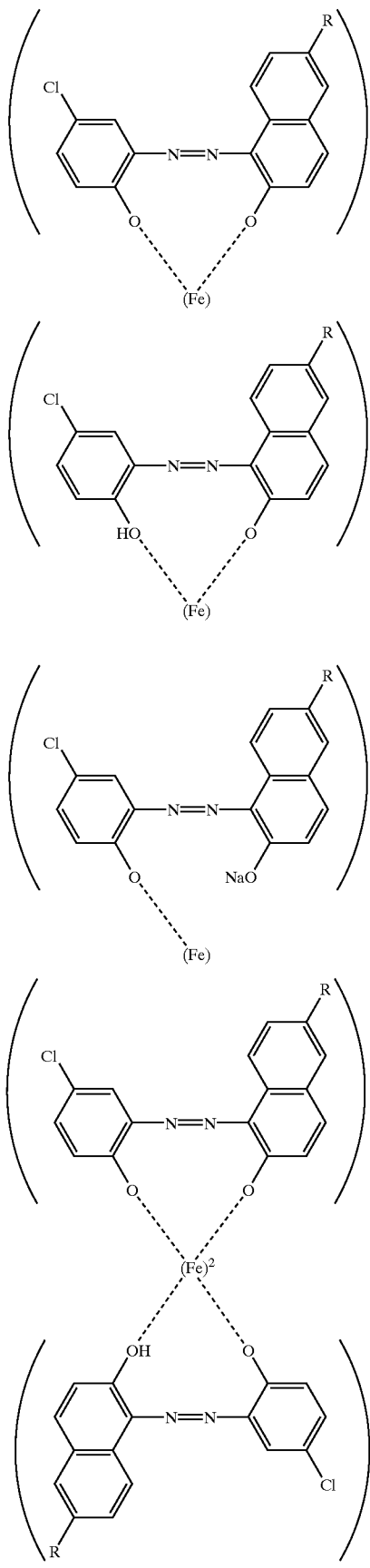

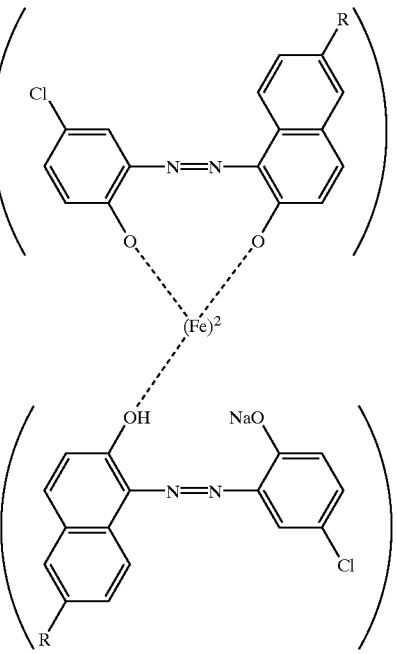

Metal (iron) complex salt compounds respectively of Formulas (a), (b), (c), etc. above are compounds identified by mass analysis (FD-MS spectral analysis etc.), and some of them are disclosed in Japanese Patent Unexamined Publication No. 7164/1999, which corresponds to U.S. Pat. No. 6,197,467, issued Mar. 6, 2001. The iron complex salt compounds obtained by the method of the present invention were also identified by the FD-MS technique, which is known to preferentially demonstrate molecular ion peaks.

In addition, the iron complex salt compound of the present invention obtained as described above yields, negative results in the Ames test, which provides an index of safety (see Examples). This is important from the viewpoint of the safety of charge control agents and toners for electrophotography to the human body.

It should be noted that many of the metal complex salt dyes produced by commonly known methods are generally crystalline. For example, the iron complex salt compound metallized in ethylene glycol, disclosed in Japanese Patent Unexamined Publication No. 7164/1999 (Example 2), has been shown to be crystalline on the basis of its X-ray diffraction spectrum. The iron complex salt compound of the present invention as synthesized by the method described in Examples below also yielded an X-ray diffraction spectrum providing evidence for crystallinity.

As examples of metal (iron) complex salt compounds in the present invention, there may be mentioned Example Compounds (1) through (15) below and mixtures of two or more kinds thereof.

(1) $[(AP\text{-}OB)_2.(Fe^{3+})](Na^+)$
(2) $[(AP\text{-}OB)_2.(Fe^{3+})](K^+)$
(3) $[(AP\text{-}OB)_2.(Fe^{3+})](H^+)$
(4) $[(AP\text{-}OB)_3.(Fe^{3+}\text{-}Fe^{3+})](Na^+)$
(5) $[(AP\text{-}OB)_3.(Fe^{3+}\text{-}Fe^{3+})](H^+)$
(6) $[(AP\text{-}OB)_3.(Fe^{'3+})_2]$ (7) $[(AP-OB)_3.(Fe^{2+}/Fe^{3+})](Na^+)$
(8) $[(AP-OB)_4.(Fe^{3+}-Fe^{3+})](Na^+)$
(9) $[(AP-OB)_4.(Fe^{3+}-Fe^{3+})](Na^+)_2$
(10) $[(AP-OB)_4.(Fe^{3+}-Fe^{3+})](H^+)_2$
(11) $[(AP-OB)_4.(Fe^{2+}/Fe^{3+})](Na^+)$
(12) $[(AP-OB)_3.(Fe^{2+})_2](Na^+)_2$
(13) $[(AP-OB).(Fe^{2+})]$
(14) $[(AP-OB).(Fe^{3+})]^+[(AP-OB)_2.(Fe^{3+})]$
(15) $[(AP-OB)_6.(Fe^{3+})_4]^{Z-}(Na^+)_n$
As other examples of metal complex salt compounds in the present invention, there may be mentioned compounds below.
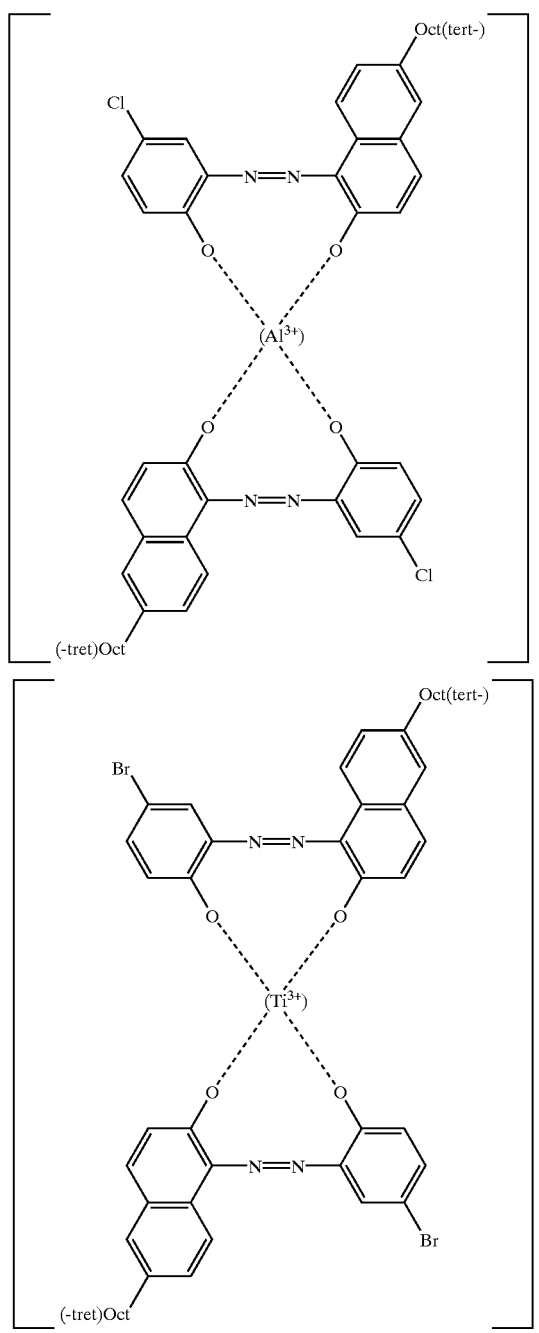
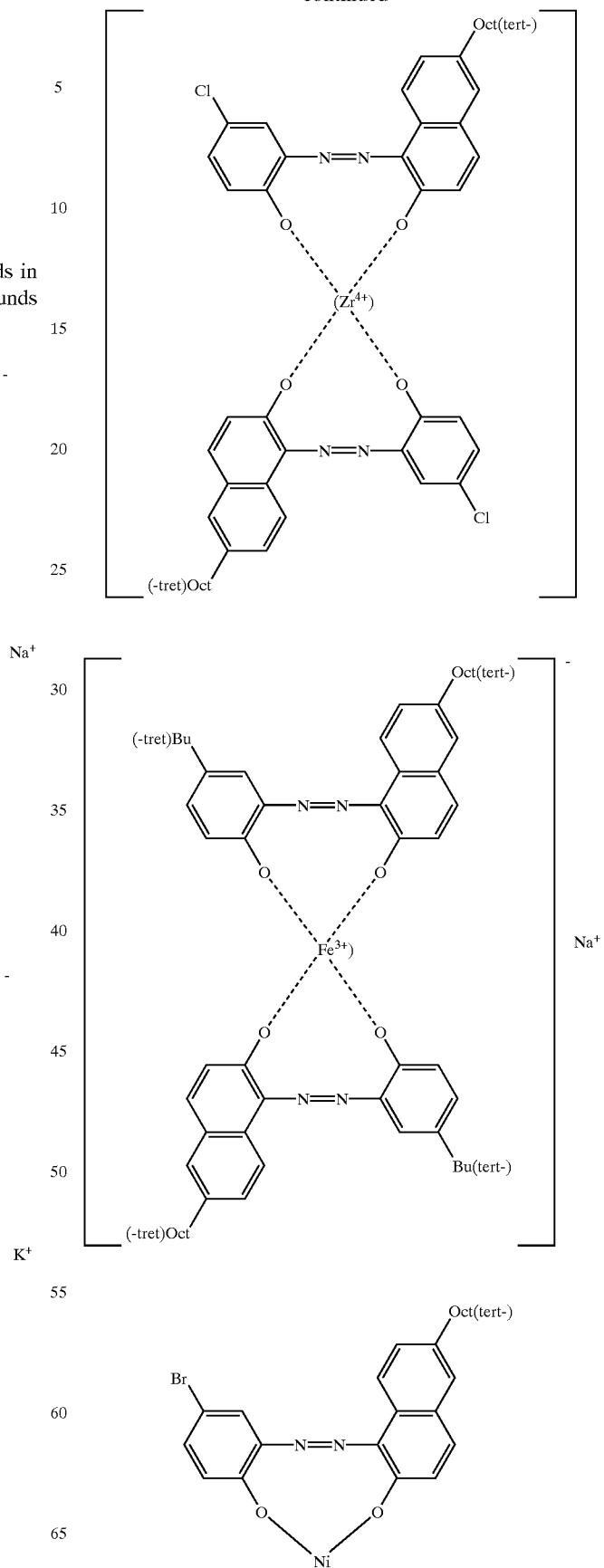

The charge control agent of the present invention shows good compatibility (wettability) with resins for toners because of the effect of the substituent R. Although it is not subject to limitation as to physical and chemical properties, its mean particle diameter is desirably not more than 20 μm, preferably not more than 10 μm, and more preferably not more than 5 μm. The pH of the charge control agent is preferably 7 to 12. Preferred iron complex salt compound as the charge control agent is sodium complex having the pH of not less than 7.

Next, the toner of the present invention for developing electrostatic images comprises the charge control agent of the present invention, a resin for toners, and a coloring agent. The metal complex salt compound constituting the charge control agent may be a single compound or a mixture of several compounds.

The toner of the present invention for developing electrostatic images is desirably formulated with the charge control agent of the present invention at 0.1 to 10 parts by weight per 100 parts by weight of the resin for toners. More preferably, the formulation amount of the charge control agent is 0.5 to 5 parts by weight per 100 parts by weight of the resin for toners.

Examples of resins useful in the toner of the present invention include the following commonly known resins for toners (binder resins). Specifically, useful resins include thermoplastic resins such as styrene resin, styrene-acrylic resin, styrene-butadiene resin, styrene-maleic acid resin, styrene-vinyl methyl ether resin, styrene-methacrylate copolymer, polyester resin and polypropylene resin. These resins may be used singly or in blends of several kinds. In addition, the charge control agent of the present invention can also be used as contained in electrostatic powder paints to control (enhance) the charge of the resin powder. In such case, useful resins for paints include, for example, thermoplastic resins of the acrylate series, polyolefin series, polyester series or polyamide series; and thermosetting resins of the phenol series, epoxy series, polyester series, or the like; these resins may be used singly or in blends of several kinds.

In the toner of the present invention for developing electrostatic images, various commonly known dyes and pigments can be used as coloring agents. Examples of useful coloring agents include organic pigments such as Quinophthalone Yellow, Isoindolinone Yellow, Perinone Orange, Perinone Red, Perylene Maroon, Rhodamine 6G Lake, Quinacridone Red, Anthanthron Red, Rose Bengale, Copper Phthalocyanine Blue, Copper Phthalocyanine Green and diketopyrrolopyrrole pigments; and inorganic pigments and metal powders such as Carbon Black, Titanium White, Titanium Yellow, Ultramarine, Cobalt Blue, red iron oxide, aluminum powder and bronze.

The toner of the present invention for developing electrostatic images can, for example, be produced as described below.

Specifically, a toner having a mean particle diameter of 5 to 20 μm can be obtained by thoroughly mixing a resin for toners as described above, a coloring agent (preferably Carbon Black), and the charge control agent of the present invention, and, if necessary, a magnetic material (e.g., fine powder of ferromagnetic metal such as iron or cobalt, ferrite), a fluidizing agent (e.g., silica, aluminum oxide, titanium oxide), an anti-offset agent (e.g., wax, low-molecular weight olefin wax) and other additives, using a ball mill or another mechanical mixer, subsequently kneading the mixture in a molten state using a hot kneader such as a heat roll, kneader or extruder, cooling and solidifying the mixture, then pulverizing the solid and classifying the resulting particles by size.

Other applicable methods include the method in which starting materials are dispersed in a binder resin solution and subsequently spray dried to yield the desired toner, and the polymerization method in which a given set of starting materials are mixed in a monomer to constitute a binder resin to yield an emulsified suspension, which is then polymerized to yield the desired toner.

When the toner of the present invention is used as a two-component developer, development can be achieved by the magnetic brush developing process or the like using the toner of the present invention in mixture with carrier powder.

Any commonly known carrier can be used without particular limitation. Examples of the carrier include iron powder, nickel powder, ferrite powder and glass beads about 50 to 200 μm in particle diameter, and such materials as coated with acrylate copolymer, styrene-acrylate copolymer, styrene-methacrylate copolymer, silicone resin, polyamide resin, ethylene fluoride resin, or the like.

When the toner of the present invention is used as a one-component developer, an appropriate amount of a fine powder of a ferromagnetic material, such as iron powder, nickel powder or ferrite powder, may be added and dispersed in preparing the toner as described above. Examples of developing processes which can be used in this case include the contact development process and the jumping development process.

EXAMPLES

The present invention is hereinafter described in more detail by means of the following examples, which are not to be construed as limitative. In the description below, "part(s) by weight" is referred to as "part(s)" for short.

Example 1
Synthesis of Monoazo Compound

After 45.7 parts of 4-chloro-2-aminophenol, 110.5 parts of 35% hydrochloric acid and 244.9 parts of 2-propanol were stirred and mixed, this mixture was cooled externally to 0 to 5° C. To this mixture, 65.8 parts of 36% sodium nitrite was added, and this was followed by stirring within the temperature range from 0 to 50° C. for 2 hours to diazotize the 4-chloro-2-aminophenol.

Next, the NaCl which precipitated in this diazotized compound solution was filtered off; the filtrate obtained was added drop by drop to a mixed liquor (kept at 45 to 50° C.) of 244.9 parts of 2-propanol, 64 parts of a 48.7% aqueous solution of sodium hydroxide and 81.6 parts of 6-tertiary octyl-2-naphthol; this mixed liquor was stirred for 2 hours to carry out a coupling reaction, followed by cooling (not more than 30° C.); the monoazo compound precipitated was then collected by filtration, washed with water, and dried, to yield 115.3 parts (yield 90%) of a monoazo compound of the following structure:

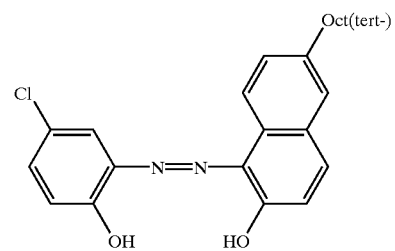

Elemental analysis results for the monoazo compound obtained (AP-OB) are shown in Table 1.

TABLE 1

|  | C | H | N | Cl | Na |
|---|---|---|---|---|---|
| Actual measurement values | 70.45 | 6.75 | 6.33 | 6.94 | 907(ppm) |
| Calculated values | 70.15 | 6.62 | 6.82 | 7.78 | — |

The results of high performance liquid chromatography analysis (HPLC analysis) for the production rate (%) of this monoazo compound are shown in Table 2.

Synthesis of Iron Complex Salt Compound

After 100 parts of the monoazo compound obtained above was gradually added to a mixed liquor of 187 parts of 2-propanol and 40 parts of a 48.7% aqueous solution of sodium hydroxide, followed by 2 hours of refluxing under heating at 80° C., 50 parts of 38% ferric chloride was added, followed by 2 hours of refluxing under heating at 80° C., to achieve metallization.

Next, this reaction mixture was cooled to 30° C. and dispersed in 1,025 parts of water, and stirred at 30° C. for 1 hour; the product precipitated was collected by filtration and washed with water, then dried, to yield 113 parts of an iron complex salt compound as a blackish brown powder.

The FD-MS spectrum of the iron complex salt compound obtained is shown in FIG. 1 (the abscissa indicates M/Z [mass/charge]; the ordinate indicates relative abundance [relative detection strength of ion]).

From FIG. 1, it is found that this iron complex salt compound is a mixture of:

(1) a 2:1 type iron complex salt compound wherein two monoazo compounds are coordinated to one Fe(III), i.e., [(AP-OB)$_2$.(Fe$^{3+}$)](Na$^+$) MW:896;

(4) a 3:2 type iron complex salt compound wherein three monoazo compounds are coordinated to two Fe(III), i.e., [(AP-OB)$_3$.(Fe$^{3+}$-Fe$^{3+}$)](Na$^+$) MW:1361;

(9) a 4:2 type iron complex salt compound wherein four monoazo compounds are coordinated to two Fe(III), i.e., [(AP-OB)$_4$.(Fe$^{3+}$-Fe$^{3+}$)](Na$^+$)$_2$ MW:1793; and a polymeric iron complex salt compound of unknown structure (MW:2247).

In this iron complex salt compound (mixture), no unreacted monoazo compound (MW: 409+2H) was observed.

Figure 2:
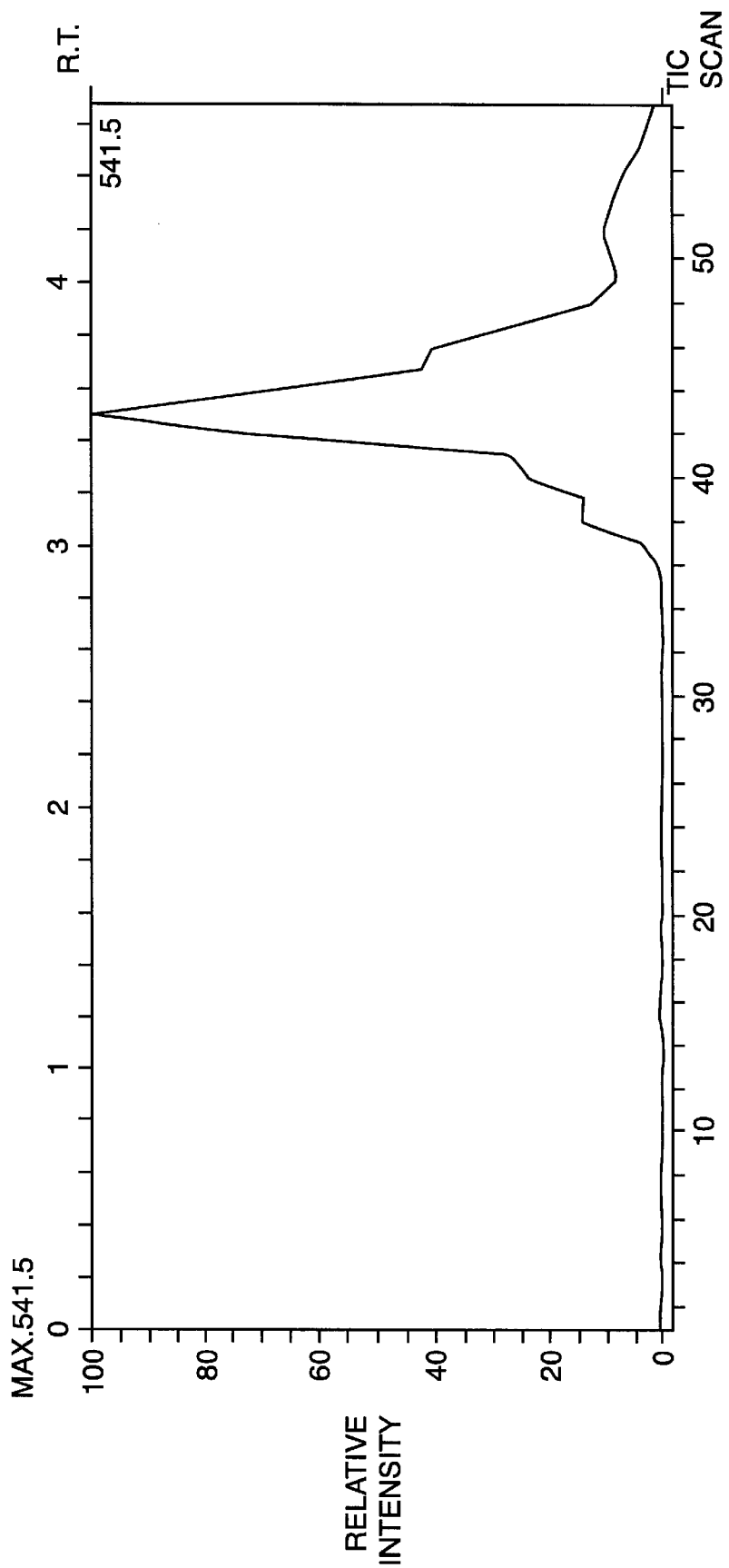
FIG. 2 is a TIC spectrum by the FD method of the iron complex salt compound obtained in Example 1.

The TIC (total ion chromatography) spectrum of this iron complex salt compound as obtained by the FD method is shown in FIG. 2 (the abscissa indicates the number of scans, and the ordinate indicates relative intensity [ion strength]).

Example 2

Synthesis of Monoazo Compound

After 45.7 parts of 4-chloro-2-aminophenol, 110.5 parts of 35% hydrochloric acid and 244.9 parts of 2-propanol were stirred and mixed, this mixture was cooled externally to 0 to 5° C. To this mixture, 65.8 parts of 36% sodium nitrite was added, and this was followed by stirring within the temperature range from 0 to 5° C. for 2 hours to diazotize the 4-chloro-2-aminophenol.

Next, the NaCl which precipitated in this diazotized compound solution was filtered off; the filtrate obtained was added drop by drop to a mixed liquor (kept at 45 to 50° C.) of 244.9 parts of 2-propanol, 64 parts of a 48.7% aqueous solution of sodium hydroxide and 81.6 parts of 6-tertiary octyl-2-naphthol; this mixed liquor was stirred for 2 hours to carry out a coupling reaction; the monoazo compound precipitated was then collected by filtration and washed with water to yield 228 parts of a wet cake of a monoazo compound.

The results of high performance liquid chromatography analysis (HPLC analysis) for the production rate (%) of this monoazo compound are shown in Table 2.

Synthesis of Iron Complex Salt Dye

After 190.5 parts (100 parts, based on solid content) of the monoazo compound wet cake obtained was gradually added to a mixed liquor of 187 parts of 2-propanol and 40 parts of a 48.7% aqueous solution of sodium hydroxide, followed by 2 hours of refluxing under heating at 83° C., 50 parts of 38% ferric chloride was added, followed by 2 hours of refluxing under heating at 83° C., to achieve metallization.

Next, this reaction mixture was dispersed in 1,025 parts of water and stirred at 30° C. for 1 hour; the product precipitated was collected by filtration and washed with water, then dried, to yield 113 parts of an iron complex salt compound as a blackish brown powder.

The FD-MS spectrum and the TIC spectrum of the iron complex salt compound obtained was substantially the same as spectrums of FIG. 1 and FIG. 2 for the compound obtained in Example 1.

Example 3

Synthesis of Monoazo Compound

After 45.7 parts of 4-chloro-2-aminophenol, 110.5 parts of 35% hydrochloric acid and 346.4 parts of ethylene glycol were stirred and mixed, this mixture was cooled externally to 0 to 5° C. To this mixture, 67.7 parts of 36% sodium nitrite was added, and this was followed by stirring within the temperature range from 0 to 5° C. for 2 hours to diazotize the 4-chloro-2-aminophenol.

Next, this diazotized compound solution was added drop by drop to a mixed liquor (kept at 45 to 50° C.) consisting of a mixed liquor of 692.8 parts of ethylene glycol and 311 parts of water, 64 parts of a 48.7% aqueous solution of sodium hydroxide, and 81.6 parts of 6-tertiary octyl-2-naphthol; this mixed liquor was stirred for 2 hours to carry out a coupling reaction; the monoazo compound precipitated was then collected by filtration, washed with water, and dried, to yield 115.6 parts of the desired monoazo compound.

The results of high performance liquid chromatography analysis (HPLC analysis) for the production rate (%) of this monoazo compound are shown in Table 2.

Example 4

One-pot Method

After 45.7 parts of 4-chloro-2-aminophenol, 110.5 parts of 35% hydrochloric acid and 244.9 parts of 2-propanol were stirred and mixed, this mixture was cooled externally to 0 to 5° C. To this mixture, 67.7 parts of 36% sodium nitrite was added, and this was followed by stirring within the temperature range from 0 to 5° C. for 2 hours to diazotize the 4-chloro-2-aminophenol.

Next, the NaCl which precipitated in this diazotized compound solution was filtered off; the filtrate obtained was added drop by drop to a mixed liquor (kept at 45 to 50° C.) of 244.9 parts of 2-propanol, 64 parts of a 48.7% aqueous solution of sodium hydroxide and 81.6 parts of 6-tertiary octyl-2-naphthol; this mixed liquor was stirred for 2 hours to carry out a coupling reaction.

After a 48.7% aqueous solution of sodium hydroxide was gradually added to a suspension of this monoazo compound, followed by 2 hours of refluxing under heating at 82° C., 52 parts of 38% ferric chloride was added, followed by 2 hours of refluxing under heating at 82° C., to achieve metallization.

Next, this reaction mixture was dispersed in 1,180 parts of water and stirred at 30° C. for 1 hour; the product precipitated was collected by filtration and washed with water, then dried, to yield 113 parts of an iron complex salt compound as a blackish brown powder.

Comparative Example 1
Synthesis of Monoazo Compound

In the same manner as in Example 1, except that 2-propanol was replaced with water, a monoazo compound was obtained by a diazotizing coupling reaction.

The results of high performance liquid chromatography analysis (HPLC analysis) for the production rate (%) of this monoazo compound are shown in Table 2.

TABLE 2

| | HPLC analysis (%) Reaction time (hr) | | | | |
|---|---|---|---|---|---|
| | 0.5 | 2.0 | 20.0 | After drying | Yield (%) |
| Example1 | 94.0 | 99.6 | 99.6 | 99.9 | about 90.0 |
| Example2 | 93.3 | 98.7 | 99.0 | 99.1 | about 92.0 |
| Example3 | 94.5 | 97.0 | 98.9 | 99.0 | about 90.0 |
| Comparative Example 1 | 64.7 | 77.7 | 78.8 | 82.7 | about 85.0 |

The results of the Ames test [solvent: DMSO (dimethylsulfoxide)] for a monoazo compound (SAMPLE 1) and iron complex salt compound (SAMPLE 2) obtained in Examples 1 to 4 are shown in Tables 3 and 4, respectively. In the tables, S9mix(+) indicates the presence of metabolic activity, and S9mix(−) indicates the absence of metabolic activity. In addition, + in the columns for the strains TA-100 and TA-98 indicates that a precipitate was observed.

TABLE 3

| SAMPLE 1 | μg/plate | TA-100 | TA-98 |
|---|---|---|---|
| S9mix(−) | 20 | 0.94 | 1.00 |
| | 78 | 0.94+ | 1.00+ |
| | 313 | 0.83+ | 0.92+ |
| | 1250 | 0.85+ | 1.15+ |
| | 5000 | 0.80+ | 1.23+ |
| S9mix(+) | 20 | 1.22 | 1.41 |
| | 78 | 1.26+ | 1.59+ |
| | 313 | 1.10+ | 0.82+ |
| | 1250 | 1.17+ | 1.06+ |
| | 5000 | 1.46+ | 0.94+ |

TABLE 4

| SAMPLE 2 | μg/plate | TA-100 | TA-98 |
|---|---|---|---|
| S9mix(−) | 20 | 0.85 | 1.00 |
| | 78 | 0.93+ | 1.55+ |
| | 313 | 0.91+ | 1.27+ |
| | 1250 | 0.97+ | 1.27+ |
| | 5000 | 0.90+ | 1.18+ |
| S9mix(+) | 20 | 1.38 | 0.93 |
| | 78 | 1.34+ | 0.93+ |
| | 313 | 1.29+ | 0.78+ |
| | 1250 | 1.09+ | 0.78+ |
| | 5000 | 1.18+ | 0.44+ |

As is evident from Tables 3 and 4, the monoazo compound and iron complex salt compound of the present invention yield negative results in the Ames test and are very safe.

Example 5
Synthesis of Monoazo Compound

After 45.7 parts of 4-chloro-2-aminophenol (purity 98%), 110.5 parts of 35% hydrochloric acid and 245.2 parts of 2-propanol were stirred and mixed, this mixture was cooled externally to 0 to 5° C. To this mixture, 65.8 parts of 36% sodium nitrite was added, and this was followed by stirring within the temperature range from 0 to 50° C. for 2 hours to diazotize the 4-chloro-2-aminophenol.

Next, the NaCl which precipitated in this diazotized compound solution was filtered off; the filtrate obtained was added drop by drop to a mixed liquor (kept at 45 to 50° C.) of 245.2 parts of 2-propanol, 64.1 parts of a 48.7% aqueous solution of sodium hydroxide and 81.6 parts of 6-tertiary octyl-2-naphthol (purity 98%); this mixed liquor was stirred for 2 hours to carry out a coupling reaction; the monoazo compound precipitated was then collected by filtration, washed with water, and dried, to yield 115.4 parts (yield 90%) of a monoazo compound of the following structure. The filtrate (before water washing) obtained by collecting by filtration the monoazo compound was recovered as the filtrate A1 (518.4 parts):

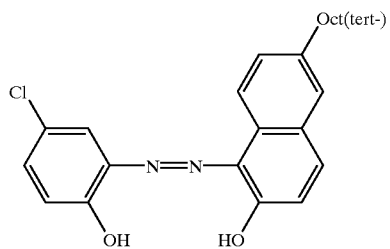

The results of high performance liquid chromatography analysis (HPLC analysis) for the production rate (%) of this monoazo compound are shown in Table 5.

Synthesis of Iron Complex Salt Compound

After 100 parts of the monoazo compound obtained above was gradually added to a mixed liquor of 189.4 parts of 2-propanol and 40.1 parts of a 48.6% aqueous solution of sodium hydroxide, followed by 2 hours of refluxing under heating at 81° C., 50 parts of 38% ferric chloride was added, followed by 2 hours of refluxing under heating at 81° C., to achieve metallization.

Next, after this reaction mixture was allowed to cool to 30° C., the product precipitated was collected by filtration and washed with water, then dried, to yield 110 parts of an iron complex salt compound as a blackish brown powder. The filtrate (before water washing) obtained by collecting by filtration the precipitated product was recovered as the filtrate A2 (253.4 parts).

The FD-MS spectrum and the TIC spectrum of the iron complex salt compound obtained was substantially the same as spectrums of FIG. 1 and FIG. 2 for the compound obtained in Example 1.

From the filtrate A1 and the filtrate A2 above, 486.2 parts of an azeotrope of 2-propanol and water (recovered IPA-1) [azeotropic temperature 80 to 82° C./2-propanol concentration 87.64% by weight] was obtained by distillation (recovery: about 63%).

By carrying out the synthesis and recovery step as above three times, 1460 parts of the recovered IPA-1 was obtained.

Example 6
One-pot Method

After 43.6 parts of 4-chloro-2-aminophenol (purity 99%), 105.1 parts of 35.5% hydrochloric acid and 236.3 parts of 2-propanol were stirred and mixed, this mixture was cooled externally to 0 to 5° C. To this mixture, 59.9 parts of 36% sodium nitrite was added, and this was followed by stirring within the temperature range from 0 to 5° C. for 2 hours to diazotize the 4-chloro-2-aminophenol.

Next, the NaCl which precipitated in this diazotized compound solution was filtered off; the filtrate obtained was added drop by drop to a mixed liquor (kept at 45 to 50° C.) of 228.3 parts of 2-propanol, 61.5 parts of a 48.9% aqueous solution of sodium hydroxide and 76 parts of 6-tertiary octyl-2-naphthol (purity 98.3%); this mixed liquor was stirred for 2 hours to carry out a coupling reaction.

The results of a high performance liquid chromatography analysis (HPLC analysis) for the production rate (%) of this monoazo compound performed using samples collected after completion of the coupling reaction are shown in Table 5.

Synthesis of Iron Complex Salt Compound

After 49.2 parts of a 48.9% aqueous solution of sodium hydroxide was gradually added to a suspension of this monoazo compound, followed by 2 hours of refluxing under heating at 82° C., 50 parts of 38% ferric chloride was added, followed by 2 hours of relfluxing under heating at 82° C., to achieve metallization.

Next, after this reaction mixture was allowed to cool to 30° C., the product precipitated was collected by filtration and washed with water, then dried, to yield 113.3 parts of an iron complex salt compound as a blackish brown powder.

The filtrate (before water washing) obtained by collecting by filtration the precipitated product was recovered as the filtrate B1 (614.2 parts). From the filtrate B1, 337.8 parts of an azeotrope of 2-propanol and water (recovered IPA-2) [azeotropic temperature 80 to 82° C./2-propanol concentration 87.64% by weight] was obtained by distillation (recovery: about 55%).

By carrying out the synthesis and recovery step as above twice, 670 parts of the recovered IPA-2 were obtained.

Example 7

Synthesis of Monoazo Compound

After 45.7 parts of 4-chloro-2-aminophenol (purity 98%), 110.5 parts of 35% hydrochloric acid and 245.2 parts of the recovered IPA-1 were stirred and mixed, this mixture was cooled externally to 0 to 5° C. To this mixture, 65.8 parts of 36% sodium nitrite was added, and this was followed by stirring within the temperature range from, 0 to 5° C. for 2 hours to diazotize the 4-chloro-2-aminophenol.

Figure 3:
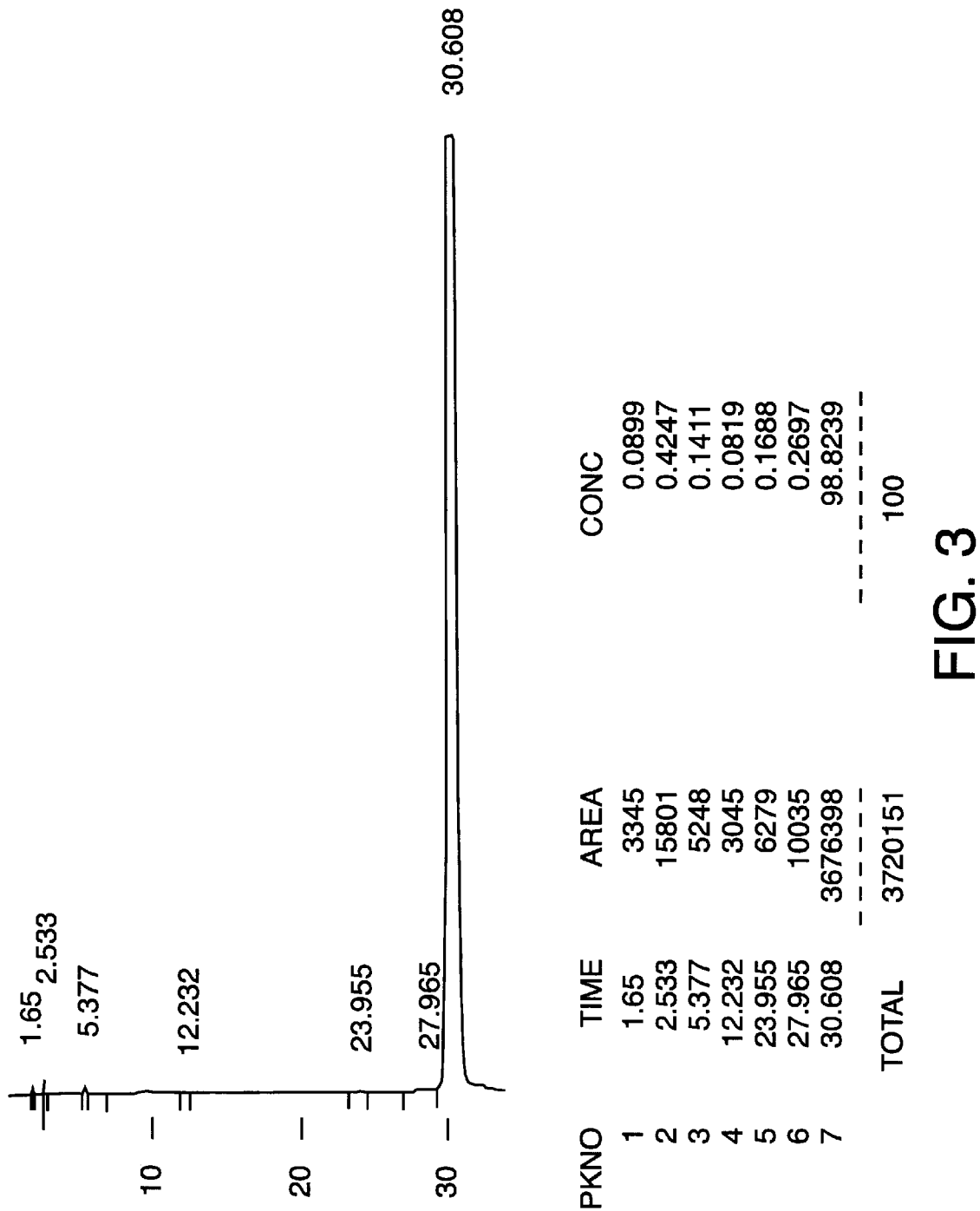
FIG. 3 shows a high performance liquid chromatography of the monoazo compound obtained in Example 7.

Next, the NaCl which precipitated in this diazotized compound solution was filtered off; the filtrate obtained was added drop by drop to a mixed liquor (after stirred under heating at 80° C. for an hour, cooled and kept at 46° C.) of 279 parts of the recovered IPA-1, 81.6 parts of a 48.7% aqueous solution of sodium hydroxide and 81.6 parts of 6-tertiary octyl-2-naphthol (purity 98%); this mixed liquor was stirred for 2 hours to carry out a coupling reaction; the monoazo compound precipitated was then collected by filtration, washed with water, and dried, to yield 113.7 parts (yield 88.7%) of a monoazo compound. The filtrate (before water washing) obtained by collecting by filtration the monoazo compound was recovered as the filtrate A3 (568 parts):

The results of high performance liquid chromatography analysis (HPLC analysis) for the production rate (%) of this monoazo compound are shown in Table 5. The chart of the HPLC analysis is shown in FIG. 3.

Synthesis of Iron Complex Salt Compound

After 100 parts of the monoazo compound obtained above was gradually added to a mixed liquor of 189 parts of the recovered IPA-1 and 40.1 parts of a 48.6% aqueous solution of sodium hydroxide, followed by 2 hours of refluxing under heating at 82° C., 50 parts of 38% ferric chloride was added, followed by 2 hours of refluxing under heating at 82° C., to achieve metallization.

Next, after this reaction mixture was allowed to cool to 30° C., the product precipitated was collected by filtration and washed with water, then dried, to yield 110 parts of an iron complex salt compound as a blackish brown powder. The filtrate (before water washing) obtained by collecting by filtration the precipitated product was recovered as the filtrate A4 (245 parts).

The FD-MS spectrum and the TIC spectrum of the iron complex salt compound obtained was substantially the same as spectrums of FIG. 1 and FIG. 2 for the compound obtained in Example 5.

From the filtrate A3 and the filtrate A4 above, 318 parts of an azeotrope of 2-propanol and water (recovered IPA-3) [azeotropic temperature 80 to 81° C.] was obtained by distillation (recovery: about 62%).

Example 8

Synthesis of Monoazo Compound

In the quite same manner as in Example 7, 115.6 parts of the monoazo compound was obtained using the recovered IPA-1 obtained in Example 5. And the filtrate A5 (563 parts) was recovered same manner as in Example 7.

The results of high performance liquid chromatography analysis (HPLC analysis) for the production rate (%) of this monoazo compound are shown in Table 5.

Synthesis of Iron Complex Salt Compound

In the quite same manner as in Example 7, 112 parts of the desired iron complex salt compound was obtained using the recovered IPA-1 obtained in Example 5. And the filtrate A6 (243 parts) was recovered same manner as in Example 7.

The FD-MS spectrum and the TIC spectrum of the iron complex salt compound obtained was substantially the same as spectrums of FIG. 1 and FIG. 2 for the compound obtained in Example 5.

From the filtrate A5 and the filtrate A6 above, 489.8 parts of an azeotrope of 2-propanol and water (recovered IPA-4) was obtained by distillation (recovery: about 61%).

Example 9

One-pot Method

After 43.6 parts of 4-chloro-2-aminophenol (purity 99%), 105.1 parts of 35% hydrochloric acid and 236 parts of the recovered IPA-2 were stirred and mixed, this mixture was cooled externally to 0 to 5° C. To this mixture, 59.9 parts of 36% sodium nitrite was added, and this was followed by stirring within the temperature range from 0 to 5° C. for 2 hours to diazotize the 4-chloro-2-aminophenol.

Next, the NaCl which precipitated in this diazotized compound solution was filtered off; the filtrate obtained was added drop by drop to a mixed liquor (after stirred under heating at 80° C. for an hour, cooled and kept at 46° C.) of 254 parts of the recovered IPA-2, 65.1 parts of a 48.9% aqueous solution of sodium hydroxide and 76 parts of 6-tertiary octyl-2-naphthol (purity 98.3%); this mixed liquor was stirred for 2 hours to carry out a coupling reaction.

The results of a high performance liquid chromatography analysis (HPLC analysis) for the production rate (%) of this monoazo compound performed using samples collected after completion of the coupling reaction are shown in Table 5.

After 49.2 parts of a 48.9% aqueous solution of sodium hydroxide was gradually added to a suspension of this monoazo compound, followed by 2 hours of refluxing under heating at 82° C., 50 parts of 38% ferric chloride was added, followed by 2 hours of refluxing under heating at 82° C., to achieve metallization.

Next, after this reaction mixture was allowed to cool to about 30° C., the product precipitated was collected by filtration and washed with water, then dried, to yield 113 parts of an iron complex salt compound as a blackish brown powder.

The filtrate (before water washing) obtained by collecting by filtration the precipitated product was recovered as the filtrate B2 (660 parts).

The FD-MS spectrum and the TIC spectrum of the iron complex salt compound obtained was substantially the same as spectrums of FIG. 1 and FIG. 2 for the compound obtained in Example 5.

From the filtrate B2 above, 369.9 parts of an azeotrope of 2-propanol and water (recovered IPA-5) was obtained by distillation (recovery: about 56%).

Example 10
Synthesis of Zirconium Complex Salt Compounds

A zirconium complex salt compound was obtained in the same manner of treatment as in Example 5, except that the aqueous solution of ferric chloride used in the metallizing reaction of Example 5 was replaced with, zirconium chloride (IV).

In the same manner as in Example 7, except that the azeotrope of 2-propanol and water obtained from the filtrate in the synthesis treatment for this zirconium complex compound was used, and that the aqueous solution of ferric chloride used in Example 7 was replaced with zirconium chloride (IV), another zirconium complex salt compound was obtained.

Example 11
Synthesis of Aluminum Complex Salt Compounds

An aluminum complex salt compound was obtained in the same manner of treatment as in Example 6, except that the aqueous solution of ferric chloride used in the metallizing reaction of Example 5 was replaced with aluminum chloride (III).

In the same manner as in Example 9, except that the azeotrope of 2-propanol and water obtained from the filtrate in the synthesis treatment for this aluminum complex compound was used, and that the aqueous solution of ferric chloride used in Example 9 was replaced with aluminum chloride (III), another aluminum complex salt compound was obtained.

The monoazo compound and the metal complex salt compound obtained in Examples 5 to 11 yield negative results in the Ames test and are very safe.

Comparative Example 2
Synthesis of Monoazo Compound

In the same manner as in Example 7, except that the recovered IPA-1 was replaced with water, a monoazo compound was obtained by a diazotizing coupling reaction.

Figure 4:
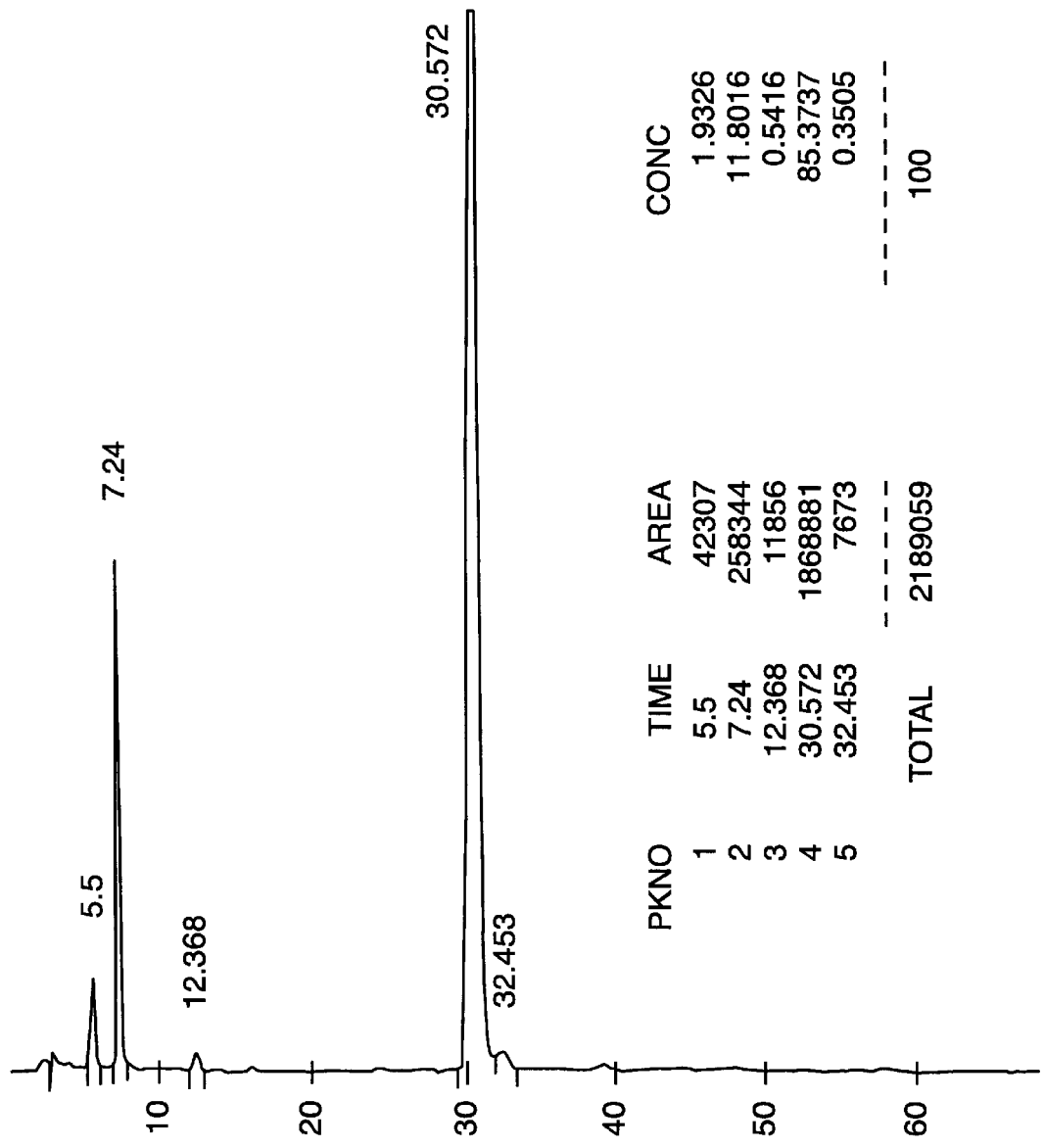
FIG. 4 shows a high performance liquid chromatography of the monoazo compound obtained in Comparative Example 2.

The results of high performance liquid chromatography analysis (HPLC analysis) for the production rate (%) of this monoazo compound are shown in Table 5. The chart of the HPLC analysis is shown in FIG. 4.

Synthesis of Iron Complex Salt Compound

An iron complex salt compound was obtained by the same metallizing reaction as in Example 7, except that the recovered IPA-1 used in Example 7 was replaced with water. This iron complex salt compound was found to contain the unreacted monoazo compound.

TABLE 5

|  | HPLC analysis (%) | | | |
|---|---|---|---|---|
|  | Reaction time (min) | | | |
|  | 30 | 120 | After drying | Yeild (%) |
| Example 5 | 93.20 | 97.39 | 98.64 | about 90.0 |
| Example 6 | 94.22 | 98.34 | 98.52 | — |
| Example 7 | 93.38 | 98.61 | 98.82 | about 88.7 |
| Example 8 | 95.21 | 98.00 | 98.56 | about 90.2 |
| Example 9 | 93.50 | 97.05 | 97.55 | — |
| Comparative Example 2 | 75.94 | 85.07 | 85.37 | about 75.5 |

Next, example embodiments of toners of the present invention for developing electrostatic images containing the charge control agent as obtained by the manufacturing process of the present invention are described in Examples I through VII below.

Example I

Styrene-acrylic copolymer resin (produced by Sanyo Kasei Co., Ltd., trade name: HIMER SMB600) . . . 100 parts
Low polymer polypropylene (produced by Sanyo Kasei Co., Ltd., trade name: Biscal 550P) . . . 5 parts
Carbon Black (produced by Mitsubishi Chemical Corporation, trade name: MA-100) . . . 7 parts
Charge control agent (iron complex salt compound obtained in Example 1). . . 1 part The above ingredients were uniformly pre-mixed using a high-speed mill to yield a premix, which was then kneaded in a molten state using a heat roll, cooled and thereafter roughly milled using an ultracentrifugal mill. The rough milling product obtained was finely pulverized using an air jet mill equipped with a mechanical classifier to yield a black toner 5 to 15 µm in particle diameter.

Five parts of this toner was admixed with 95 parts of an iron powder carrier (produced by Powdertech, trade name: TEFV200/300) to yield a developer.

Figure 5:
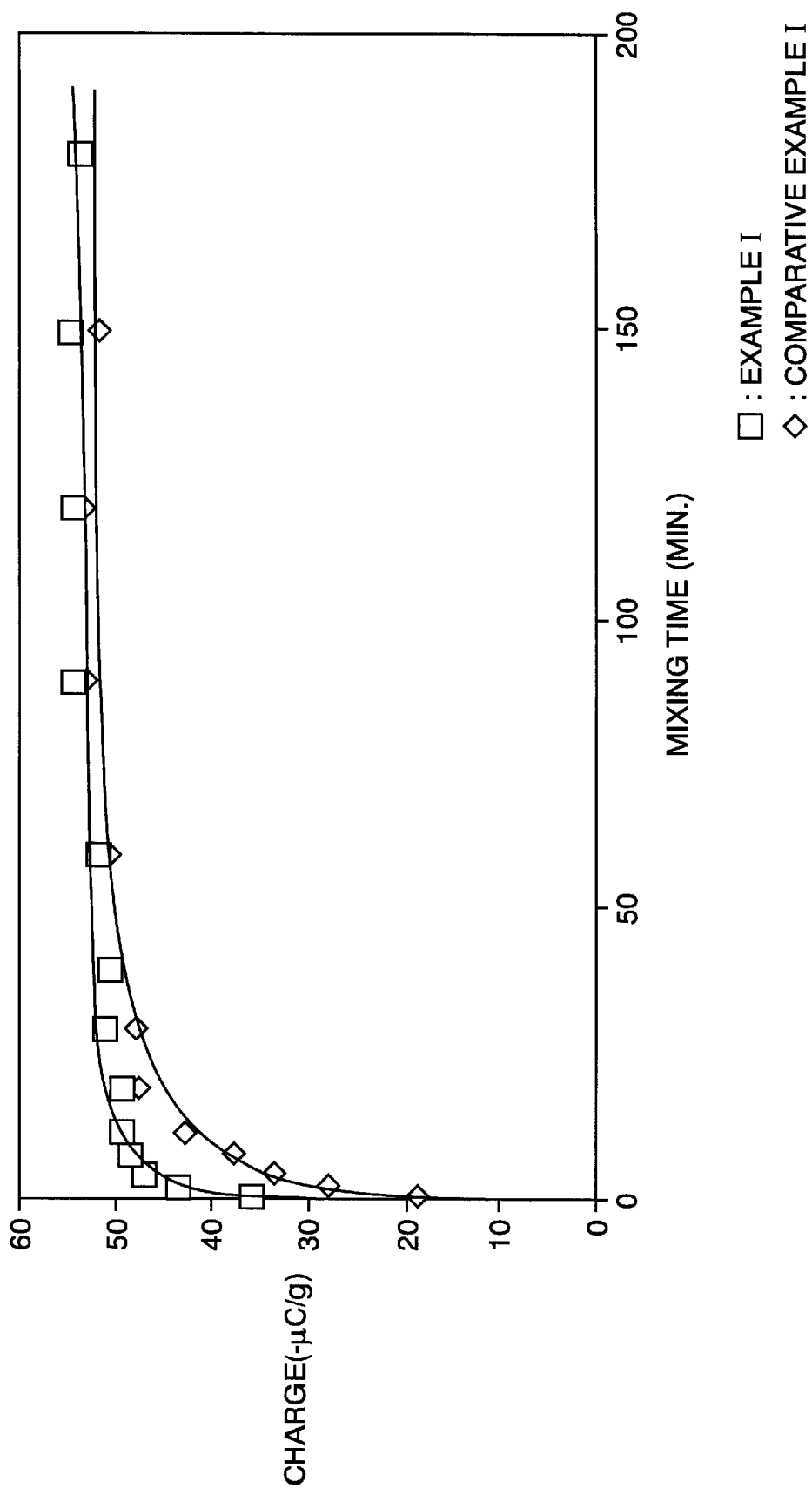
FIG. 5 shows the charge characteristics of a developer using the toner of Example I and a developer using the toner of Comparative Example I.

After the developer obtained was thoroughly stirred, the amount of charges was determined by the blowoff method (Toshiba Chemical blowoff charge analyzer [trade name: TB-200] used). The results of determination are shown in FIG. 5. In FIG. 5, the abscissa indicates developer mixing time (min), and the ordinate indicates the amount of charges ($-\mu C/g$).

The amount of blowoff charges of this developer was stable under low-temperature low-humidity conditions and under high-temperature high-humidity conditions, demonstrating. good storage stability. When this toner was used to repeatedly form toner images using a commercial copying machine, the charge stability and retention were good, and high-quality images with no offset phenomenon, image density reduction or fogging were obtained.

Example II

Polyester resin (produced by Nippon Synthetic Chemical Industry Co., Ltd., trade name: HP-301) . . . 100 parts
Low polymer polypropylene (produced by Sanyo Kasei Co., Ltd., trade name: Biscal 550P) . . . 5 parts
Carbon Black (produced by Mitsubishi Chemical Corporation, trade name: MA100) . . . 7 parts
Charge control agent (iron complex salt compound obtained in Example 2) . . . 1 part The above ingredients were treated in the same manner as in Example I to yield a black toner and a developer, and the developer was evaluated. The amount of blowoff charges of this developer was stable under low-temperature low-humidity conditions and under high-temperature high-humidity conditions, demonstrating good storage stability. When this toner was used to repeatedly form toner images, the charge stability and retention were good, and high-quality images with no offset phenomenon, image density reduction or fogging were obtained, as in Example I.

Example III

Styrene-2-ethylhexyl methacrylate copolymer resin . . . 100 parts
Triiron tetraoxide [produced by Toda Kogyo Corporation, trade name: EPT-500] . . . 70 parts
Low polymer polypropylene [produced by Sanyo Kasei Co., Ltd., trade name: Biscal 550P] . . . 3 parts
Carbon Black [produced by Mitsubishi Chemical Corporation, trade name: MA-100] . . . 7 parts
Charge control agent (iron complex,salt compound obtained in Example 1) . . . 2 parts The above ingredients were uniformly pre-mixed using a ball mill to yield a premix, which was then kneaded in a molten state using a heat roll, cooled and thereafter roughly milled, finely pulverized and classified by size to yield a one-component toner 5 to 15 μm in particle diameter.

When this toner was used for a commercial copying machine to form toner images, fogging-free images with good thin-line reproducibility were obtained. Also, even in continuous copying, the image density was stable, with no staining due to toner splashing.

Comparative Example I

A toner and a developer were prepared in the same manner as in Example I, except that the charge control agent of the present invention used in Example I (iron complex salt compound obtained in Example 1) was replaced with a crystalline iron complex salt compound of the following structure, and their charge characteristics were compared. The results are shown in FIG. 5.

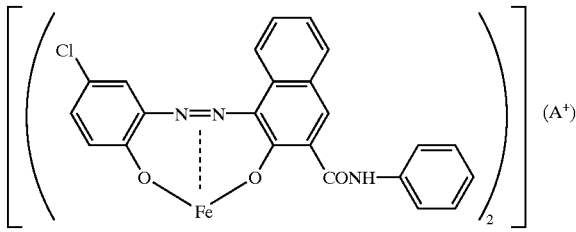

Example IV

Styrene-acrylic copolymer resin (produced by Sanyo Kasei Co., Ltd., trade name: HIMER SMB600) . . . 100 parts:
Low polymer polypropylene (produced by Sanyo Kasei Co., Ltd., trade name: Biscal 550P) . . . 3 parts
Carbon Black (produced by Mitsubishi Chemical Corporation, trade name: MA-100) . . . 7 parts
Charge control agent (iron complex, salt compound obtained in Example 7) . . . 1 part The above ingredients were uniformly pre-mixed using a high-speed mill to yield a premix, which was then kneaded in a molten state using a heat roll, cooled and thereafter roughly milled using an ultracentrifugal mill. The rough milling product obtained was finely pulverized using an air jet mill equipped with a mechanical classifier to yield a black toner 5 to 15 μm in particle diameter.

Five parts of this toner was admixed with 95 parts of an iron powder carrier (produced by Powdertech, trade name: TEFV200/300) to yield a developer.

After the developer obtained was thoroughly stirred, the amount of charges was determined by the blowoff method (Toshiba Chemical blowoff charge analyzer [trade name: TB-200] used).

The amount of blowoff charges of this developer was still more stable under low-temperature low-humidity conditions and under high-temperature high-humidity conditions, demonstrating still better storage stability. When this toner was used to repeatedly form toner images using a commercial copying machine, the charge stability and retention were still better, and high-quality images with no offset phenomenon, image density reduction or fogging were obtained.

Example V

A toner and a developer were prepared in the same manner as in Example IV, except that the charge control agent used in Example IV (iron complex salt compound obtained in Example 7) was replaced with the iron complex salt compound obtained in Example 8, and developing was conducted therewith; high-quality images with no image density reduction or fogging were obtained as in Example IV.

Example VI

Polyester resin (produced by Nippon Synthetic Chemical Industry Co., Ltd., trade name: HP-301) . . . 100 parts
Low polymer polypropylene (produced by Sanyo Kasei Co., Ltd., trade name: Biscal 550P) . . . 3 parts
Carbon Black (produced by Mitsubishi Chemical Corporation, trade name: MA100) . . . 7 parts
Charge control agent (iron complex salt compound obtained in Example 9) . . . 1 part The above ingredients were treated in the same manner as in Example IV to yield a black toner and a developer, and the developer was evaluated. The amount of blowoff charges of this developer was stable under low-temperature low-humidity conditions and under high-temperature high-humidity conditions, demonstrating good storage stability, as in Example IV. When this toner was used to repeatedly form toner images the charge stability and retention were good, and high-quality images with no offset phenomenon, image density reduction or fogging were obtained, as in Example IV.

Example VII

Styrene-2-ethylhexyl methacrylate copolymer resin . . . 100 parts
Triiron tetraoxide [produced by Toda Kogyo Corporation, trade name: EPT-500] . . . 70 parts
Low polymer polypropylene [produced by Sanyo Kasei Co., Ltd., trade name: Biscal 550P] . . . 2 parts
Carbon Black [produced by Mitsubishi Chemical Corporation, trade name: MA-100] . . . 7 parts
Charge control agent (zirconium complex salt compound obtained in Example 10) . . . 2 parts The above ingredients were uniformly pre-mixed using a ball mill to yield a premix, which was then kneaded in a molten state using a heat roll, cooled and thereafter roughly milled, finely pulverized and classified by size to yield a one-component toner 5 to 15 μm in particle diameter.

When this toner was used for a commercial copying machine to form toner images, fogging-free images with good thin-line reproducibility were obtained. Also, even in continuous copying, the image density was stable, with no staining due to toner splashing.

What is claimed is:

1. A process for preparing a metal complex salt compound of formula (I):

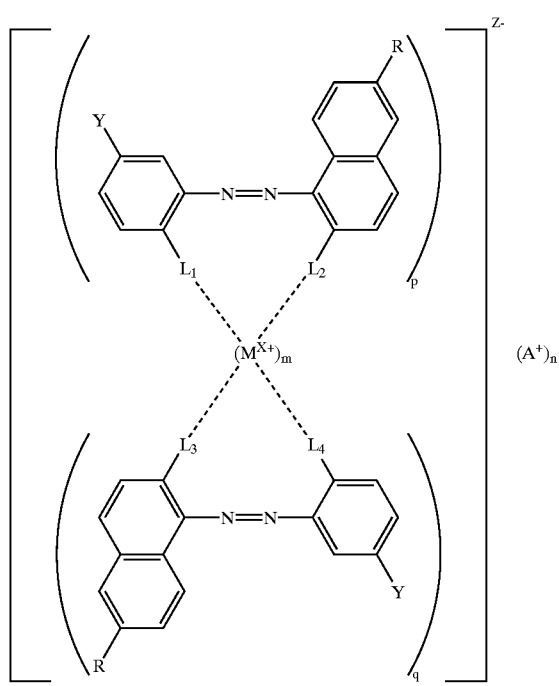

wherein
R is a normal or branched alkyl group having 4–12 carbon atoms
Y is a halogen atom or a normal or branched alkyl group having 1–5 carbon atoms;
each of p and q shows the number of corresponding monoazo compounds coordinated to the metal M; such that p is 1, 2, 3 or 4; q is 0, 1, 2 or 3; and the sum of p+q is an integer of 1–6;
each of $L_1$ and $L_2$ is —O—;
one of $L_3$ and $L_4$ is —O—, while the other is an —OH group or an —O$^{31}$ ion;
M is iron, nickel, aluminum, titanium or zirconium;
$(M^{x+})_m$ represents an m number of metals of atomic valence x; such that m is an integer of 1–4; and x is an integer of 2 or more;
Z– is the negative charge in the parentheses; and $(A^{30})_n$ is a hydrogen ion or an alkali metal ion; and n=Z;
which comprises an initial step of diazotizing coupling reaction to produce a monoazo compound of formula (II):

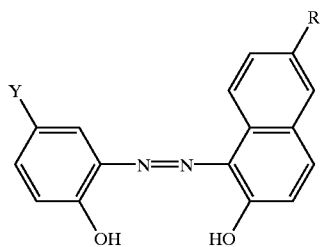

wherein R and Y are the same as defined above;
in which a corresponding 4-Y-2-aminophenol wherein Y is the same as defined above is diazotized to the corresponding diazonium salt and the diazonium salt is in turn coupled with a corresponding 6-R-2-naphthol wherein R is the same as defined above to form the monoazo compound of formula (II); in which a monohydric alcohol is used as solvent in the diazotizing coupling reaction; and which comprises a subsequent step of metallizing the resulting monoazo compound of formula (II) with iron, nickel, aluminum, titanium or zirconium to produce a metal complex salt compound in a metallizing reaction in which a monohydric alcohol is used as solvent, whereby to obtain a metal complex salt compound of not less than about 90% purity.

2. The process of claim 1 wherein the monohydric alcohol is 2-propanol.

3. The process of claim 1 wherein Y is a halogen atom.

4. The process of claim 1 wherein R is a tert-octyl group and Y is chlorine.

5. The process of claim 1 wherein iron chloride is used as a metallizing agent in the metallizing reaction.

6. The process of claim 1 wherein, after the metallizing reaction is carried out, the process comprises a further step of cooling the reaction mixture and separating the resulting precipitated metal complex salt compound from the cooled reaction mixture.

7. A process for preparing a metal complex salt compound of formula (I)

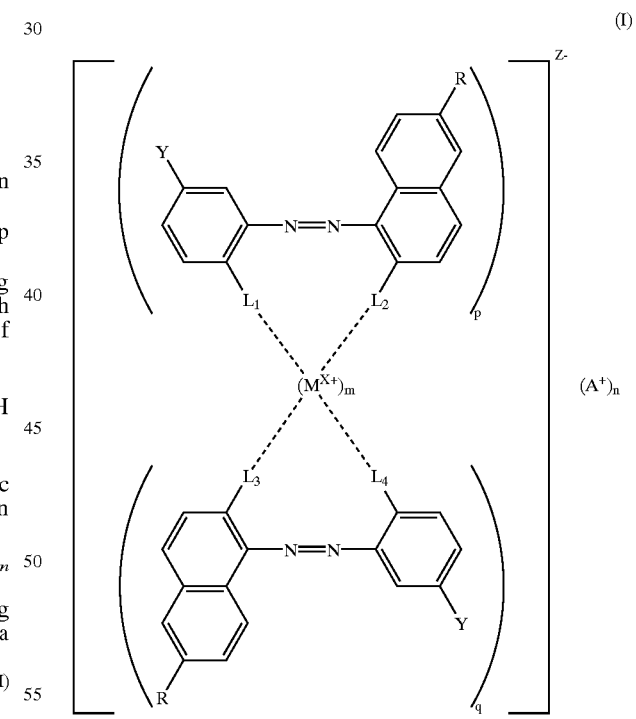

wherein
R is a normal or branched alkyl group having 4–12 carbon atoms;
Y is a halogen atom or a normal or branched alkyl group having 1–5 carbon atoms;
each of p and q shows the number of corresponding monoazo compounds coordinated to the metal M; such that p is 1, 2, 3 or 4; q is 0, 1, 2 or 3; and the sum of p+q is an integer of 1–6;

each of $L_1$ and $L_2$ is —O—;

one of $L_3$ and $L_4$ is —O—, while the other is an —OH group or an —O$^{31}$ ion;

M is iron, nickel, aluminum, titanium or zirconium;

$(M^{x+})_m$ represents an m number of metals of atomic valence x; such that m is an integer of 1–4; and x is an integer of 2 or more;

Z– is the negative charge in the parentheses; and $(A^{30})_n$ is a hydrogen ion or an alkali metal ion; and n=Z;

which comprises metallizing a monoazo compound of formula (II):

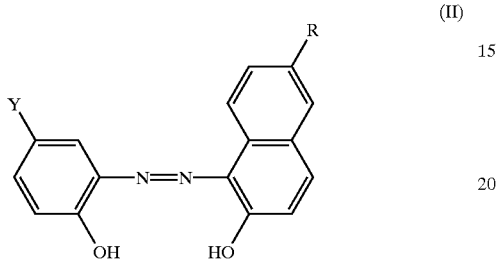

(II)

wherein R and Y are the same as defined above and wherein the monoazo compound of formula (II) is prepared by a diazotizing coupling reaction in which a corresponding 4-Y-2-aminophenol wherein Y is the same as defined above is diazotized to the corresponding diazonium salt, and the diazonium salt is in turn coupled With a corresponding 6-R-2-naphthol wherein R is the same as defined above to form the monoazo compound of formula (II), the diazotizing coupling reaction being carried out in a monohydric alcohol as solvent;

with a metallizing agent containing a metal M as defined above in a monohydric alcohol as solvent, sufficiently to react substantially completely the monoazo compound of formula (II) and to produce a reaction mixture containing substantially no unreacted monoazo compound and containing the metal complex salt compound of formula (I) in high yield and in a high purity of not less than about 90%.

8. The process of claim 7 wherein 4-chloro-2-aminophenol is diazotized in 2-propanol as monohydric alcohol solvent, and the resulting diazotized compound is subjected as diazo component to a coupling reaction with 6-tertiary octyl-2-naphthol as coupling component in 2-propanol as monohydric alcohol solvent to form the monoazo compound of formula (II).

* * * * *